United States Patent [19]

Uchimura et al.

[11] Patent Number: 5,353,383
[45] Date of Patent: Oct. 4, 1994

[54] NEURAL NETWORK CIRCUIT

[75] Inventors: Kuniharu Uchimura; Osamu Saito, both of Kanagawa; Yoshihito Amemiya; Atsushi Iwata, both of Tokyo, all of Japan

[73] Assignee: Nippon Telegraph and Telephone Corporation, Tokyo, Japan

[21] Appl. No.: 909,993

[22] Filed: Jul. 7, 1992

Related U.S. Application Data

[62] Division of Ser. No. 727,065, Jul. 8, 1991, Pat. No. 5,166,539.

[30] Foreign Application Priority Data

| Jul. 9, 1990 | [JP] | Japan | 2-179665 |
| Jul. 9, 1990 | [JP] | Japan | 2-179666 |
| Jul. 13, 1990 | [JP] | Japan | 2-186528 |
| Sep. 3, 1990 | [JP] | Japan | 2-232914 |
| Sep. 3, 1990 | [JP] | Japan | 2-232915 |
| Sep. 7, 1990 | [JP] | Japan | 2-235700 |
| Oct. 22, 1990 | [JP] | Japan | 2-281891 |
| Mar. 25, 1991 | [JP] | Japan | 3-60384 |
| Apr. 24, 1991 | [JP] | Japan | 3-94220 |

[51] Int. Cl.$^5$ .................................... G06F 15/18
[52] U.S. Cl. ........................... 395/24; 307/201; 364/807
[58] Field of Search ............... 395/24, 25, 27; 307/201; 364/807

[56] References Cited

U.S. PATENT DOCUMENTS

| 4,926,064 | 5/1990 | Tapang | 307/201 |
| 4,994,982 | 2/1991 | Duranton | 307/201 |
| 5,004,932 | 4/1991 | Nejime | 307/201 |
| 5,021,693 | 6/1991 | Shima | 307/201 |
| 5,097,141 | 2/1992 | Leivian | 307/201 |

*Primary Examiner*—Allen R. MacDonald
*Attorney, Agent, or Firm*—Finnegan, Henderson Farabow, Garrett & Dunner

[57] ABSTRACT

A neural network circuit including a number n of weight coefficients (W1-Wn) corresponding to a number n of inputs, subtraction circuits for determining the difference between inputs and the weight coefficients in each input terminal, the result thereof being inputted into absolute value circuits, all calculation results of the absolute value circuits corresponding to the inputs and the weight coefficients being inputted into an addition circuit and accumulated, and this accumulation result determining the output value. A threshold value circuit determines the final output value, according to a step function pattern, a polygonal line pattern, or a sigmoid function pattern, depending on the object. In the case in which a neural network circuit is realized by means of digital circuits, the absolute value circuits can include simply EX-OR logic (exclusive OR) gates. Furthermore, in the case in which the input terminals have two input paths and two weight coefficients corresponding to each input path, the neuron circuits form a recognition area having a flexible shape which is controlled by the weight coefficients.

5 Claims, 24 Drawing Sheets

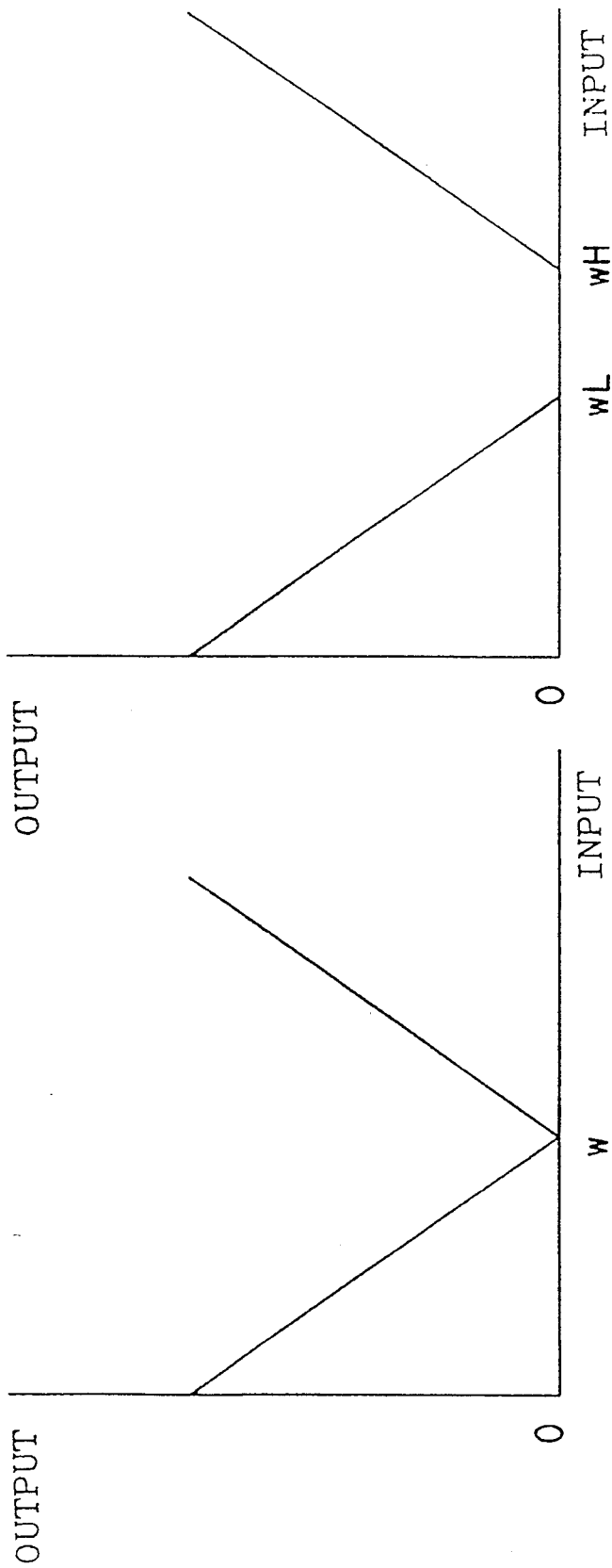

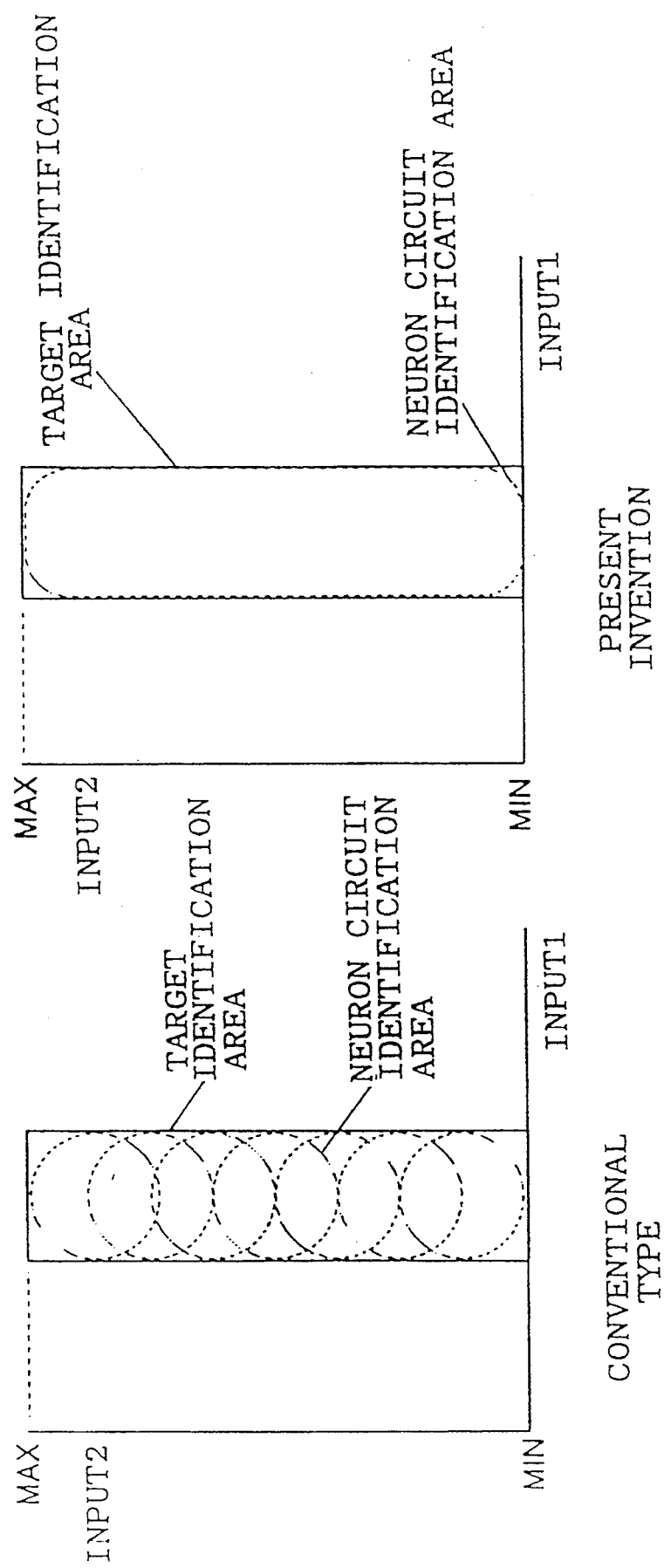

OPERATION OF ACCUMULATION CIRCUIT

STRUCTURE OF ADDITION BASE CIRCUIT

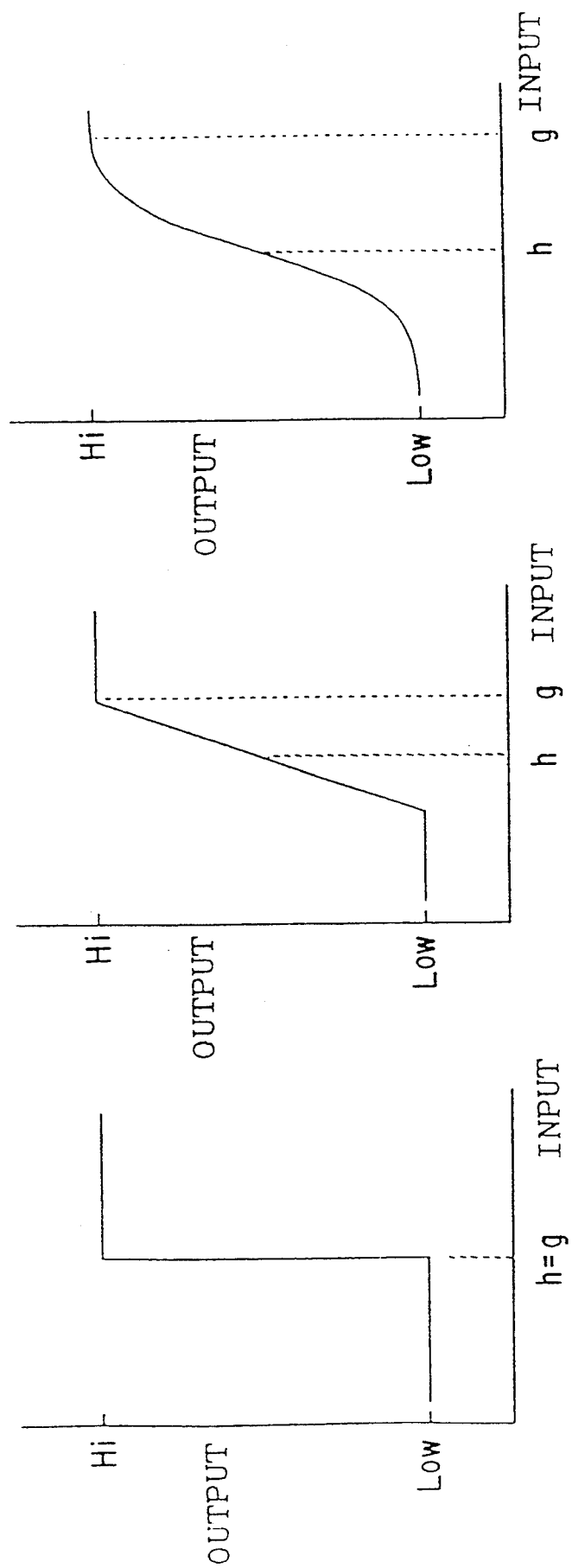

NEURAL NETWORK CIRCUIT

This is a division of application Ser. No. 07/727,065, filed Jul. 8, 1991, now U.S. Pat. No. 5,166,539.

BACKGROUND OF THE INVENTION

1. Field of the Invention

The present invention relates to a neural network circuit comprising network circuits made by the connection of input and output terminals of a plurality of neuron circuits, which serve as unit circuits.

2. Discussion of the Related Art

Neural network circuits use the nervous systems of animals as a model and are capable of pattern recognition processing, such as character recognition or voice recognition, optimization, robot control and the like, which were difficult for Neumann-type computers. In conventional Neumann-type computers, processing was conducted successively in accordance with a program, so that the calculation time was large. In contrast, in neural network circuits, the neuron circuits execute calculations in a parallel fashion, so that the speed of processing becomes extremely high. Furthermore, the functions of neural network circuits are realized by learning and the changing of the connections states between neurons. For this reason, they have the special characteristics of being able to realize functions in cases of problems which have processing procedures which are difficult to place in rule form, if learning materials are available. When such a circuit is operated while conducting normal learning, even if the functions which are desirable change over time based on changes in the environment, it is possible to construct a flexible system which will be capable of following such changes and the like. In addition, as the network is constructed by means of the connections of a plurality of identical neuron circuits, if breakdowns should occur in circuits, it is easy to conduct operations by simply replacing such circuits with other normally functioning circuits, so that it is possible to realize a high resistance to flaws in cases in which LSIs are used. The present invention is applicable to cases in which neural network circuits are constructed using LSIs, and thus relates to a method for the: construction of neuron circuits which have small-scale circuitry and consume little electricity.

The neural network circuit utilizes neuron circuits, which correspond to nerve cells, as the units thereof. It is constructed by connecting of a number of these neuron circuits. FIG. 27 shows one neuron circuit. A neuron circuit receives signals from a plurality of input terminals and has weight coefficients corresponding to the various input signals. It changes the combined strength in response to the weight coefficients and calculates the difference from the output, adds all the results, and determines the input. The structure of the neural network circuits is determined by means of connections of the neuron circuits. However, the simplest structure is a two-layer neural network structure, such as that shown in FIG. 28. The input terminal layer is called the input layer or the first layer, while the neuron circuit layer is called the second layer or the output layer. The signals from the various input terminals are supplied in parallel to all the neuron circuits and the neuron circuits are able to process the input signals in parallel. Processing is realized by having specified neuron circuits react and recognize input signals when the input signals are supplied.

However, in a two-layer neural network structure, the processing ability is not large, so that in general, a three-layer neural network structure, such as that shown in FIG. 29, is used. In the case of a three-layer structure, the second layer, or the neuron circuit layer, is termed the intermediate layer or the hidden layer, while the third-layer neuron circuit layer is called the output layer. This third layer utilizes the output of the neuron circuits of the second layer as input. There are cases in which the structure thereof is identical to that of the second layer and cases in which the structure is different. In the case of an identical structure, the output signals of the intermediate layer are inputted into all the neuron circuits of the output layer. However, a simple structure is possible in which the neuron circuits of the output layer only conduct OR logic, as shown in FIG. 29. In such a case, the outputs of the intermediate layer are each connected to only one neuron circuit of the output layer, so that the scale of the circuitry can be greatly reduced, while maintaining sufficient ability in cases in which these circuits are used for pattern recognition or the like. However, in order to deal with complex processing, it has been common to use a complex network structure in which the output of neuron circuits is fed back, a multilayered structure of three or more layers is used, or complex network circuits are combined.

A neuron circuit used in conventional neural network circuits is shown in FIG. 30. It has n weight coefficients (w1–wn) corresponding to the number of inputs n. The difference between an inputted signal and a weight coefficient is found by a subtraction circuit. This result is squared in a squaring circuit, and the calculation results of the various inputs and weight coefficients are all accumulated in an adding circuit. The output values are determined by the size of the square root of this result. The threshold value circuit which finally determines 15 the output value has transmission characteristics such as those shown in FIGS. 31(a)–(c). (a) shows a step function pattern, (b) shows a polygonal line pattern, and (c) shows a sigmoid function pattern. The sigmoid function pattern of FIG. 31(c) has high flexibility. However, as the calculations thereof are complex, it is possible to use the simplified patterns of (a) and (b).

A network circuit having the three-layered structure of FIG. 29 and which is constructed using the neuron circuits of FIG. 30 has been used for pattern recognition and the like. If the number of neuron circuits in the intermediate layer of the structure of FIG. 29 is m and the number of input terminals of the input layer is n, only a number of weight coefficients $n \times n$ exists, and only this number of subtracting circuits and squaring circuits are necessary. As the number of objects of pattern recognition increases, the number of neurons m of the intermediate layer increases, so that it can be understood that an extremely large amount of subtracting circuits and squaring circuits will become necessary. In particular, in the case in which the neural network circuit is realized by digital circuits, the circuit scale of the squaring circuit which uses multiplication circuits becomes extremely large, so that the apparatus itself becomes extremely large, and a problem exists in that a plurality of neuron circuits cannot be placed on an LSI circuit. Furthermore, the circuit becomes large with respect to the amount of electricity consumed as well as with respect to the circuit scale of the squaring circuit, so that there becomes a problem in that an extremely large amount of electricity is consumed by the unit as a whole when an extremely large number of circuits are simultaneously operated.

SUMMARY OF THE INVENTION

It is accordingly an object of the present invention to realize a neural network circuit which can be applied to LSIs, reduces the scale of the circuitry and the amount of electricity consumed while preserving the same functions as in the above conventional neural network circuits, which include neuron circuits having conventional squaring circuits.

In order to attain the above objectives, the present invention include: a number n of input terminals (n is an integer greater than 1); a number n of weight coefficients corresponding to the input terminals; subtraction circuits which determine the difference between input signals and weight coefficients; absolute value circuits which determine absolute values of the subtraction results; addition circuits which accumulate all the results of the absolute value calculations; and threshold value circuits, into which the accumulation results are inputted. In addition, in the present invention, neuron circuits, which use the output value of the threshold value circuit as an output signal, are used as unit circuits, and a network circuit is formed by connecting the input and output terminals of a plurality of the neuron circuits. Neuron circuits having independent weight coefficients with respect to the plurality of network signals inputted into the network circuit execute the calculations. The output values of all or a part of the neuron circuits in the network circuit are used as the output signal of the network circuit, and the functions of the network circuit are controlled by means of the size of the threshold value of the threshold value circuit and the weight coefficients of the various neuron circuits.

Furthermore, the present invention includes: a number n of input terminals (n is an integer greater than 1); a number 2n of weight coefficients, each two of which are provided for each input terminal, subtraction circuits which determine (input signal—wH) and subtraction circuits which determine (wL—input signal) where the weight coefficient with the greater value among each of the two member weight coefficient groups is wH and the weight coefficient with the smaller value is wL; a rectification circuit which allows positive values of the subtraction results to pass; and a threshold value circuit, into which are inputted the accumulation results of the accumulation by an adding circuit of the output of the rectification circuit either directly or after passing through a nonlinear characteristic circuit- In addition, in the present invention, neuron circuits, which use the output value of the threshold value circuit as an output signal, are used as unit circuits, and a network circuit is formed by connecting the input and output terminals of a plurality of the neuron circuits. Neuron circuits having independent weight coefficients with respect to the plurality of network signals inputted into the network circuit execute calculations. The output values of all or a part of the neuron circuits in the network circuit are used as the output signal of the network circuit, and the functions of the network circuit are controlled by means of the size of the threshold value of the threshold value circuit and the weight coefficients of the various neuron circuits.

The present invention has the see functions as those of the squaring circuits used in the conventional type neuron circuit. Also, by replacement of the squaring circuits with absolute value circuits, which are smaller in circuit scale, the squaring circuits become unnecessary, so that it is possible to reduce the scale of the circuitry and the power consumption.

Furthermore, in the conventional neuron circuits, the identification area shape was fixed, so that in order to form an identification area with a freely selectable form, an extremely large number of neuron circuits were necessary. In the present invention, it is possible to vary the identification area shape of an neuron circuit, and an identification area with a freely selectable shape with a small number of can be formed by means of neuron circuits which have double the number of weight coefficients in comparison with conventional neuron circuits.

In the neuron circuit of the present invention, it is possible to reduce the scope of the circuitry greatly in comparison with the conventional neuron circuit. Also as the power consumption increases proportionately to circuit scale, it is possible to reduce power consumption by means of reduction in circuit scale. Furthermore, it is possible to greatly reduce calculation time.

In addition, in the neural network circuits of the present invention, the necessary number of neuron circuits can be greatly reduced and the accuracy of pattern recognition can be greatly improved.

BRIEF DESCRIPTION OF THE DRAWINGS

FIGS. 4(a) and (b) show the transmission characteristics of the input part of the neuron circuit; (a) shows the characteristics of the subtraction circuit and the absolute value circuit, while (b) shows the characteristics of the subtraction circuit and the rectification circuit.

FIGS. 9(a) and (b) show a second modification of an identification area by means of a plurality of neuron circuits; (a) shows a conventional shape, while (b) shows the second preferred embodiment of the present invention.

FIGS. 31($a$), ($b$) and ($c$) show the transmission characteristics of the threshold value circuit; ($a$) shows a step-function form, ($b$) shows a polygonal line form, and ($c$) shows a sigmoid function form.

DETAILED DESCRIPTION OF THE PREFERRED EMBODIMENTS

Neuron Circuit 1

Figure 1:
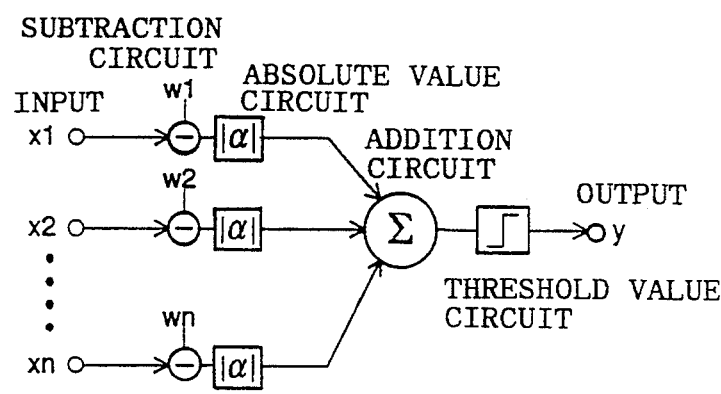
FIG. 1 shows a first preferred embodiment of the neuron circuit of the present invention.

A first preferred eodiment of the neuron circuit of the present invention is shown in FIG. 1. This circuit has n weight coefficients (w1–wn) corresponding to n inputs and the subtraction circuits determine the differences between the input signals and the weight coefficients. The results thereof are inputted into the absolute value circuits and the output values are determined based on the results thereof. The threshold value circuit, which finally determines the output value, has, as in the case of the conventional circuit, the transmission characteristics shown in FIGS. 31($a$)–($c$). In comparison with the conventional neuron circuit of FIG. 30, the squaring circuits have been replaced by absolute value circuits and the square root circuit is omitted.

Figure 30:
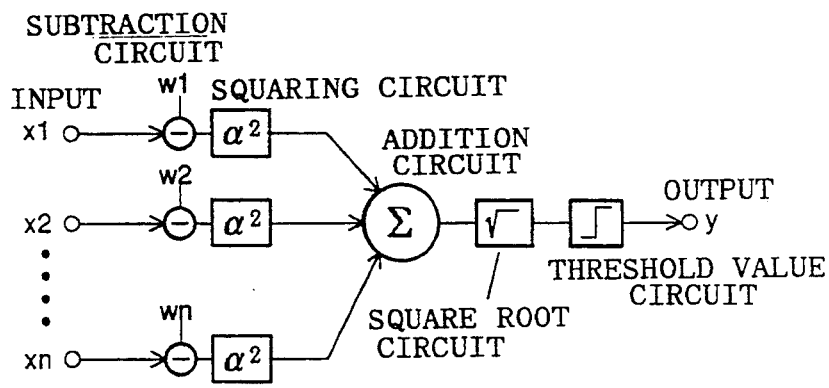
FIGS. 30 shows the structure of a conventional neuron circuit.
Figure 29:
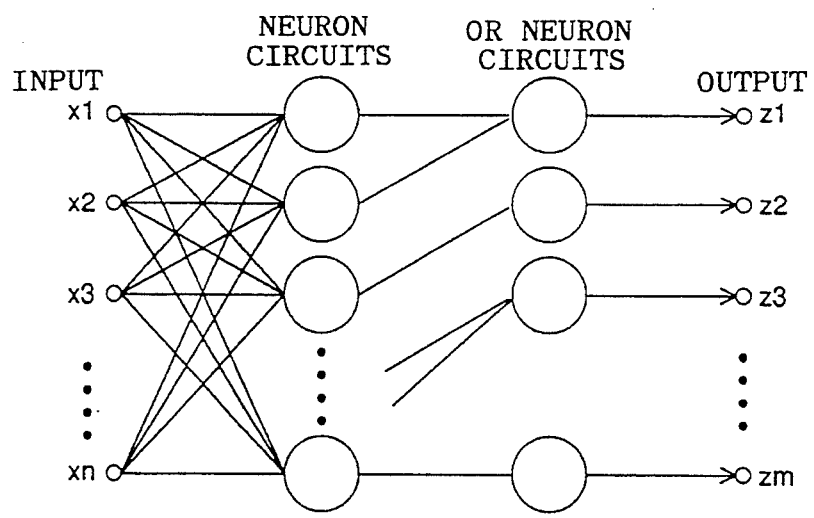
FIG. 29 shows the structure of a three-layer, structure-type neural network circuit (OR processing output type).

The network circuit of FIG. 29, which may include conventional neuron circuits of FIG. 30 or neuron circuits of the present invention of FIG. 1, is widely used in pattern recognition. By means of a pattern entered into the input layer, the neuron circuits react, and recognition is conducted. When the weight coefficients of the neuron circuits are so determined as to divide the multidimensional space of the dimensional number corresponding to the number of the input signals into a plurality of recognized areas, the neuron circuits that form the area including the inputted pattern react.

Figure 5:
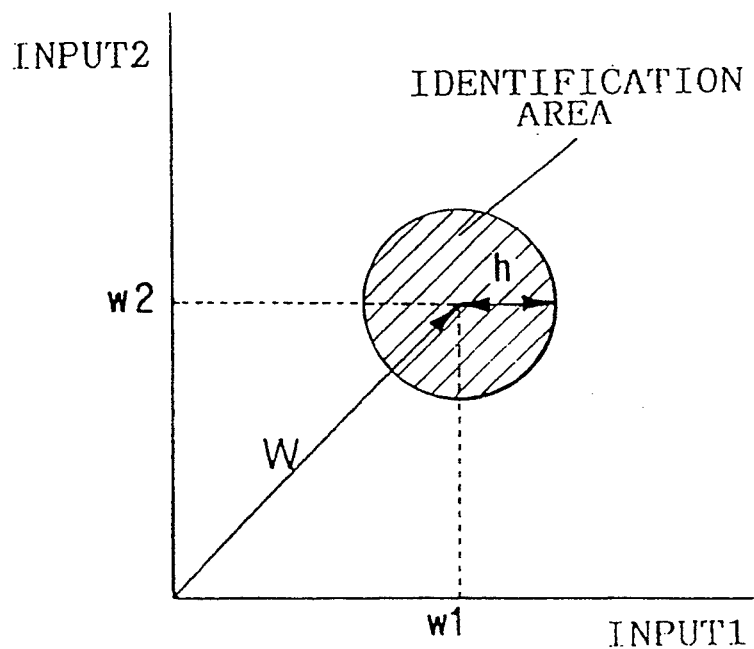
FIG. 5 shows the identification area of a conventional neuron circuit (in the case of two inputs).

In the case in which the number of inputs is 2, the shape of an area formed by one neuron circuit is circular, as shown in FIG. 5, in the case of the conventional type of FIG. 30. For example, in the case in which the values of the inputs 1 and 2 are within the circular area, so that the neuron circuit will react, it is preferable that the values of the weight coefficients w1 and w2 be set to the central point of the circle and a vector W be determined. Also, it is preferable that the size of the threshold level h of the threshold value circuit be set to the radius thereof. In other words, the distance between the vector W and the inputted vector is calculated, and if this distance is below the threshold level h, the neuron circuit outputs a reaction output (Low). Accordingly, the circle having the radius h, which has the same distance as vector W, becomes the boundary. When the transmission characteristics of the threshold value circuit are set to a step-function form as in FIG. 31($a$), the border of the identification area becomes distinct, and when the transmission characteristics are set to the characteristics shown in FIGS. 31($b$) and ($c$), the boundary has width. In the case in which the number of inputs is 3, the identification area has the form of a sphere, while in the case of four or more inputs, the identification area has the form of a prolate spheroid. The number of areas in which identification is possible increases with the increase in the number of neuron circuits. Furthermore, by conducting OR processing in the output layer, as shown in FIG. 29, the identification area can be formed by grouping a plurality of prolate spheroids, so that if a number of neuron circuits are used, it is possible to form an identification area with a freely selected shape.

Figure 6:
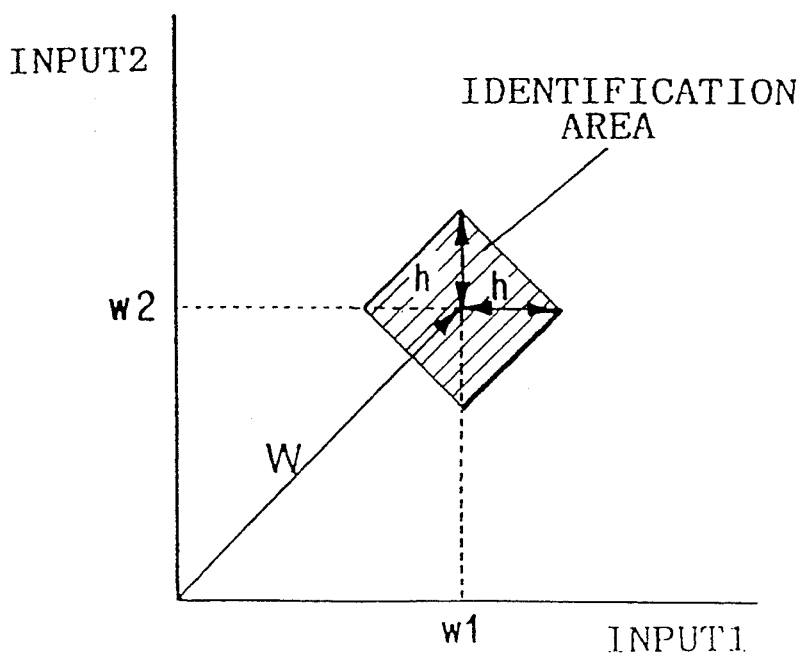
FIG. 6 the identification area of the neuron circuit of the first preferred embodiment in accordance with the present invention (in the case of two inputs).

In the first neuron circuit in accordance with the present invention, in the case in which there are two inputs, the shape of the area formed by one neuron circuit is a quadrangle, as shown in FIG. 6. In the first neuron circuit, the absolute values of the differences between the inputs and the weight coefficients are added, and if the sum thereof is smaller than the threshold level h of the threshold level value circuit, a reaction output is outputted. If the boundaries thereof are x in the case of input 1 and y in the case of input 2, then this is expressed by the straight line formula $$|X-w1|+|Y-w2|=h$$

Accordingly, in the case in which the number of inputs is 2, the shape becomes a quadrangle, as shown in FIG. 6, whereas when the number of inputs is 3, the shape is an octahedron, and when the number of inputs is 4 or more, the shape is that of a prolate multisurface body.

When a comparison is made between the identification areas of the present invention and the conventional circuit, it is clear that both possess the same functions, with the single exception that the shapes of the identification areas differ. In the case in which a plurality of neuron circuits are used and in order to form an identification area with a freely selected shape, there is a necessity to form overlapping sections, since gaps may form when arranging the circuits, so as to make contact in the shape of a prolate spheroid or a prolate multisurface body. With respect to the overlapping portions, there is little difference in the shapes of the identification areas of the two types of neuron circuits. In other words, as only the shape of the irregularities of the surface of the freely selected shape differs, there is almost no difference in performance which results from the differences in the shapes of the identification areas of the two types of neuron circuits.

Figure 10:
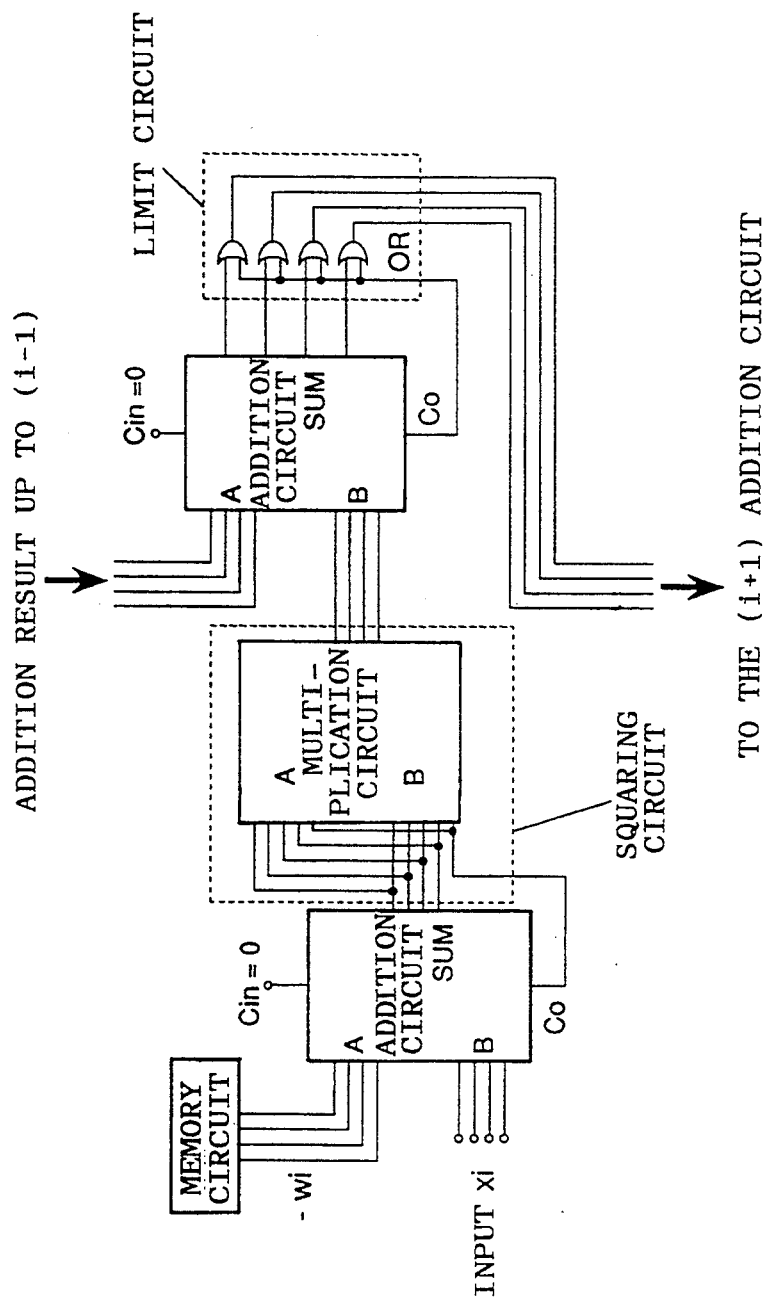
FIG. 10 shows a structural example of a calculation circuit of a conventional neuron circuit.
Figure 11:
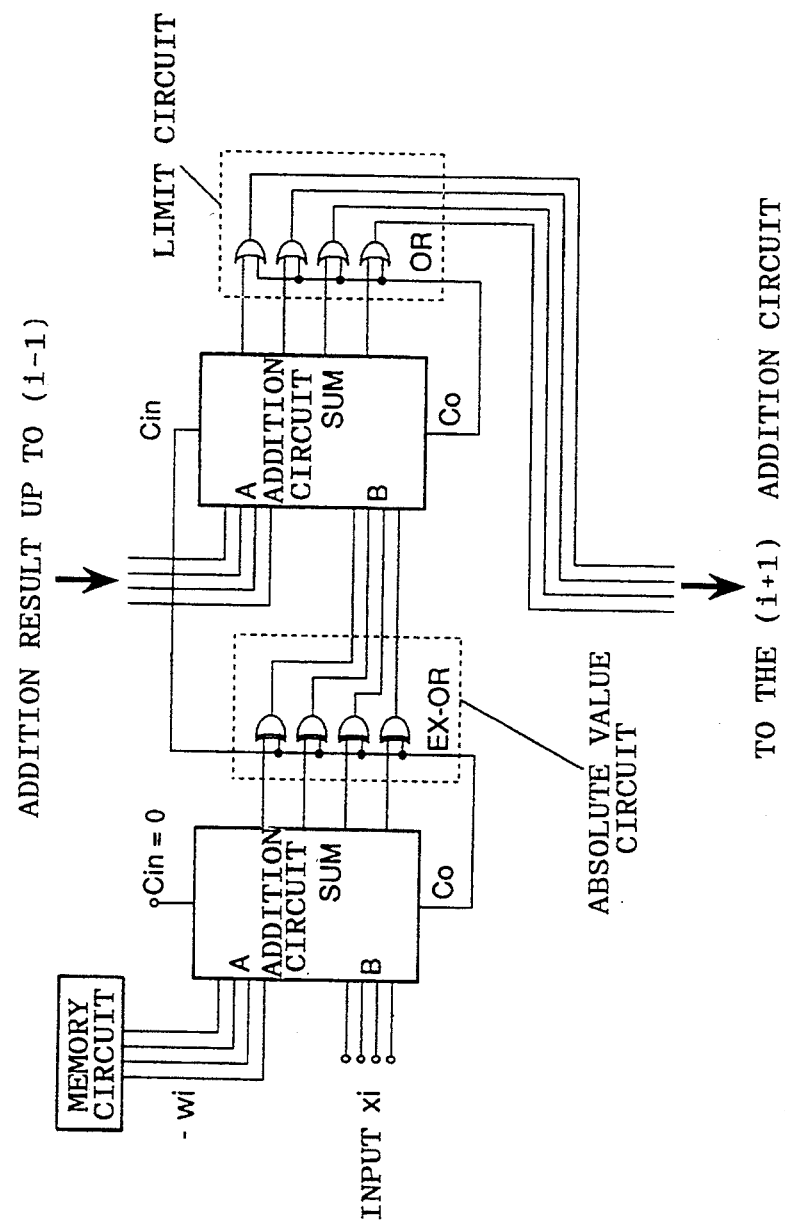
FIG. 11 is a structural example of a calculation circuit of a neuron circuit in accordance with the first preferred embodiment of the present invention.

A conventional structural example of a neuron circuit which is used in a case in which a neural network circuit is realized by means of digital circuits is shown in FIG. 10, while a circuit for this purpose in accordance with the present invention is shown in FIG. 11. In FIGS. 10 and 11, neuron circuit input portions are shown in which only an addition circuit with the number i is shown which conducts the accumulation of calculation results from 1 to n of calculation circuits with respect to a number i input and weight coefficient. When FIGS. 10 and 11 are compared, it can be seen that the structure is identical, with the exception of the difference between the squaring circuits of the conventional circuit and the absolute value circuits of the present invention. The squaring circuit of the conventional circuit is realized by means of inputting an identical signal into the two input terminals a and b of the multiplier. In contrast, the absolute value circuit of the present invention comprises only EX-OR logic (exclusive OR) gates, as shown in FIG. 11. When the difference between input i and weight coefficient wi is calculated in the addition circuit, in the case in which the calculation result is a positive number, the carry output (Co) becomes "0", while when the calculation result is a negative number, the carry output (Co) becomes "1". With two complementary display binary digital signals, in order to convert the negative numbers into positive numbers, it is preferable to invert each bit signal and to add "1". Accordingly, it is possible to conduct the addition of "1" using the carry input (Cin) of the addition circuit, which carries out the inversion of each bit signal using the EX-OR gates and conducts accumulation only when the above-mentioned Co is "1".

In FIGS. 10 and 11, an example is given of a case in which the signal is a four-bit binary digital signal. However this is for the purpose of simplifying the diagrams, and in general, a binary digital signal of more than eight-bit accuracy is used. If the number of bits in the digital signal is assumed to be Nbit, then the number of transistors Na which is necessary for the addition circuit is given by the following formula:

$Na = 28 \, Nbit$

Furthermore, the number of transistors Nm which is necessary for the multiplication circuit is given by the following formula:

$Nm + 26 \, Nbit^2$

Furthermore, the number of transistors Nz necessary for the absolute value circuit is given by the following formula:

$Nz = 16 \, Nbit$

The numbers of transistors necessary in the case of eight-bit and sixteen-bit signals would thus be as follows:

$Nbit = 8: Na = 224, Nm = 1,664, Nz = 128$ $Nbit = 16: Na = 448, Nm = 6,656, Nz = 256$ As the number of bits increases, it is clear that the circuit scale of the multiplication circuits becomes extremely large in comparison with that of the addition circuits or absolute value circuits. In this way, the neuron circuits in accordance with the present invention, which do not use multiplication circuits, represent an improvement over the conventional circuits in that the circuit scale can be greatly reduced. Furthermore, as the power consumption increases in proportion to circuit scale, it is also possible to reduce power consumption in concert with the large scale reduction in circuit scale.

In addition, when comparing the delays of the multiplication circuit and the absolute value circuit, if the delay time of the one-bit addition circuit is assumed to be Ta1, then the delay time Tm of the multiplication circuit can be approximated by the formula Tm = 2 Nbit Ta1. In contrast, the delay time of the absolute value circuit is somewhat smaller than the delay time of the one-bit addition circuit, so that it is possible to reduce the delay time to a level of 1/(2 Nbit) of that of the multiplication circuit. In this way, the neuron circuit of the present invention has an advantage in that it greatly shortens the calculation time.

Neuron Circuit 2

Figure 2:
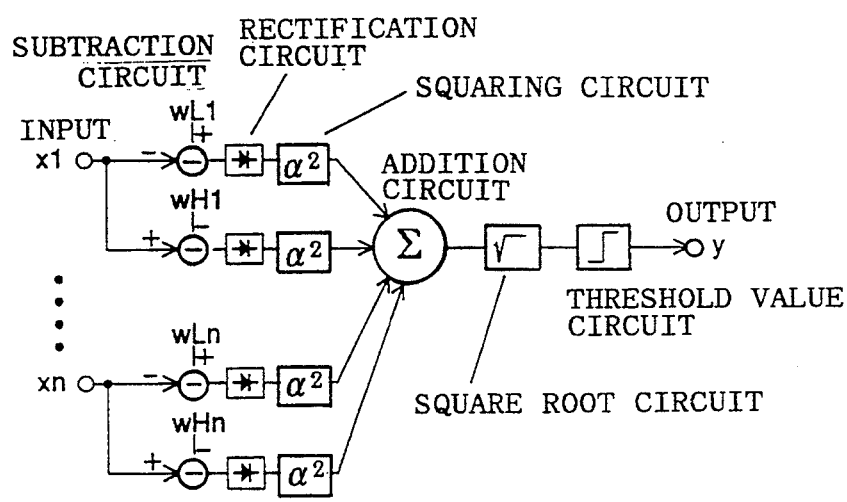
FIG. 2 shows a second preferred embodiment of the neuron circuit of the present invention.
Figure 3:
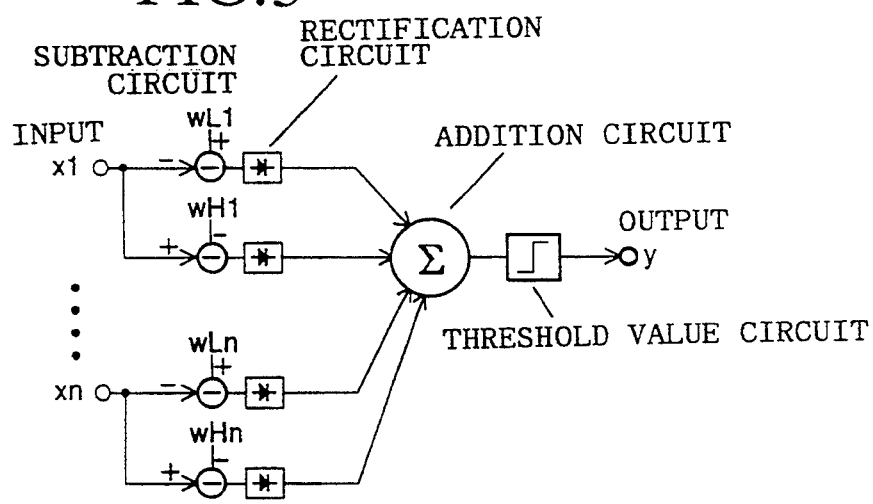
FIG. 3 shows a third preferred embodiment of the neuron circuit of the present invention.

The second and third embodiments of the neuron circuit in accordance with the present invention are shown in FIGS. 2 and 3. They are provided with n input terminals (n is an integer greater than 1), and a total of 2n weight coefficients, each two of which corresponds to each of the input terminals. If the weight coefficient with the larger value in each group of two is wH, and the weight coefficient of the smaller value is wL, then the subtraction circuit determines (input signal—wH) and (wL—input signal), and a rectification circuit is included which allows only positive values among the subtraction results to pass. The calculation results with respect to the inputs and weight coefficients are all accumulated by an adding circuit and the output value is determined from these results. The threshold value circuit which finally determines the output value has transmission characteristics such as those shown in FIG. 31, which are identical to the conventional circuit.

The transmission characteristics of the input portion in the neuron circuit of FIG. 1 are shown in FIG. 4(a). The characteristics of the subtraction circuit and the absolute value circuit assume a V shape, since the polarity of the part beneath the weight coefficient w is inverted with respect to the input signal. In a neuron circuit having a conventional squaring circuit as in FIG. 30, the characteristics are those of a parabola. In contrast, in the third neuron circuit in accordance with the present invention, two weight coefficients wH and wL are provided for one input, so that the characteristics of the input portion are as shown in FIG. 4(b). With respect to the input between wH and wL, the output level becomes 0. Furthermore, in the second neuron circuit in accordance with the present invention, by means of the squaring circuits, the straight line portions below wL and above wH become parabolic curves.

Figure 7A:
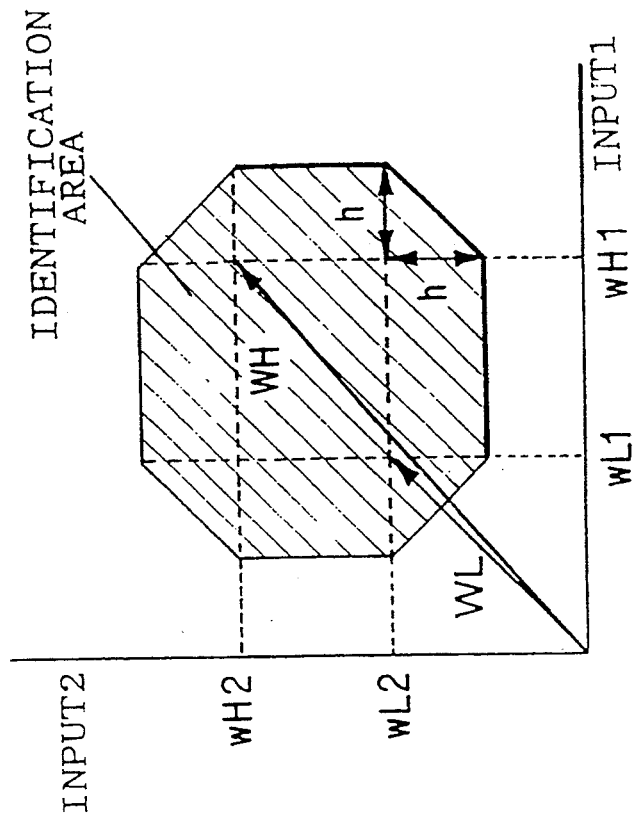
FIGS. 7(a) and (b) show shapes of identification areas of the neuron circuit of the present invention (in the case of two inputs); (a) shows a prolate spheroid form of the second preferred embodiment, while (b) shows a prolate multisurface body form of the third preferred embodiment.
Figure 7B:
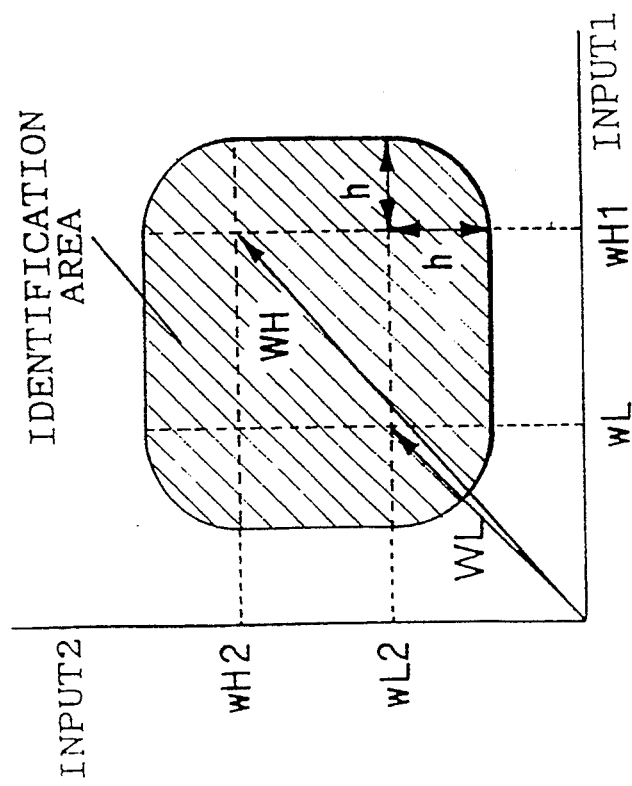

In the case in which there are two inputs, in the neuron circuits of the previous invention of FIGS. 2 and 3, the shape of the area formed by one neuron circuit is that shown in FIG. 7(a) in the case of the neuron circuit of FIG. 2 and is the shape shown in FIG. 7(b) in the case of the neuron circuit shown in FIG. 3. One neuron circuit has a vector wH with a value of the weight coefficients wH1 and wH2, and a vector wL with the value of weight coefficients wL1 and wL2. In the area in which input 1<wL1, input 2<wL2, in the area in which input 1<wL1, and input 2>wH2, in the area in which input 1>wH1 and input 2<wL2, and in the area in which input 1>wH1 and input 2>wH2, characteristics identical to those of the first neuron circuit are exhibited. However, in other regions the calculation result with respect to input 1 is 0 when input 1 is between wL1 and wH1, so that only the range of the identification area of input 2 is determined, and the area range in which the threshold value circuit outputs Low is the range from (wL2—h) to (wH2+h). The calculation result with respect to input 2 is 0 when input 2 is between wL2 and wH2, so that only the range of the identification area of input 1 is determined, and the area range in which the threshold value circuit outputs Low is the range from (wL1−h) to (wH1+h). Accordingly, when the areas of both are put together, the shape shown in FIG. 7 results. The quadrangle having as its diagonal the two points (wL1, wL2) and (wH1, wH2) is not a square but rather a rectangle, and it is clear that the shape is controlled by the weight coefficients. In the case in which the number of inputs is 3, the identification area has the form of a rectangular parallelepiped including a circumferential part with a thickness h. In the case in which the number is 4 or more, it has the form of a prolate rectangular parallelepiped including a circumferential part having a thickness of h.

Figures 8A, 8B:
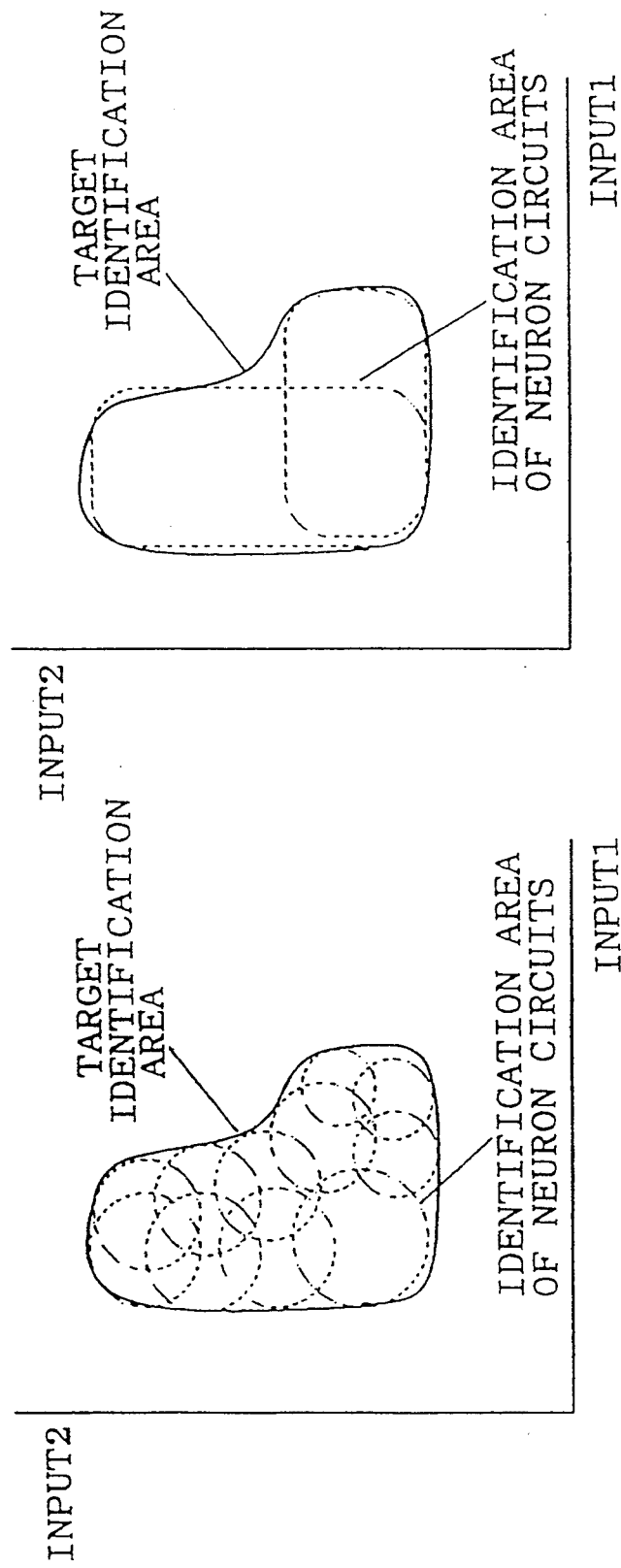
FIGS. 8(a) and (b) show a first modification of the identification area by means of a plurality of neuron circuits (in the case of two inputs); (a) shows the conventional shape, while (b) shows the second preferred embodiment of the present invention.

It has been explained that the shape of the identification area of the neuron circuit in accordance with second and third eodiment of the present invention is that shown in FIG. 7. However in a case in which vectors wL and wH are almost equal, the shape approaches that of the identification area of the first neuron circuit, and if the threshold value level h is small, the shape will be nearly rectangular. In this way, the degree of freedom in the shape of the identification area of the neuron circuit of the present invention is high. Accordingly, taking the freely selected shape shown in FIG. 8 as a target identification area, examples using conventional neuron circuits and neuron circuits in accordance with the previous invention will be shown. In the conventional example of FIG. 8(a), as explained above, many neuron circuits are necessary. However, in the case of the previous invention, as shown in FIG. 8(b) (the case of FIG. 2), an extremely small amount of neuron circuits are necessary. In addition, in the actual application, it is not the case that all inputted data can be effectively used in pattern recognition, but rather, it is the case that these data are used to extract the special data of the pattern, so that unnecessary input data is often included. FIGS. 9(a) and (b) show examples of a case in which the value of input 2 is data having no meaning. The identification area is determined by input 1, and with respect to input 2, the entire range is included in the area. As a result, an area which is long in the direction of input 2 must be realized. However, in the case in which the number of bits in the digital signal which expresses input 2 is large or in cases in which the expression is done by a floating decimal point, the range of input 2 is extremely large, and since the smaller the width of the identification area of input 1, the smaller the diameter of the circles with which the identification area must be filled, an extremely large number of neuron circuits become necessary. The actual problem is that the scale of the circuitry becomes large in proportion to the number of neurons, and a limit exists in the number of neurons, so that the range of the input signal becomes unavoidably narrow. When the range of the input signal is narrowed, the signal accuracy (resolution) declines, so that it becomes impossible to conduct accurate pattern recognition. In contrast, in the present invention, even in such cases, it is possible to use one neuron circuit irrespective of the range of the input signal, so that the necessary number of neurons can be reduced to a great extent. Furthermore, it is clear that it is also possible to greatly improve the accuracy of pattern recognition.

Figure 12:
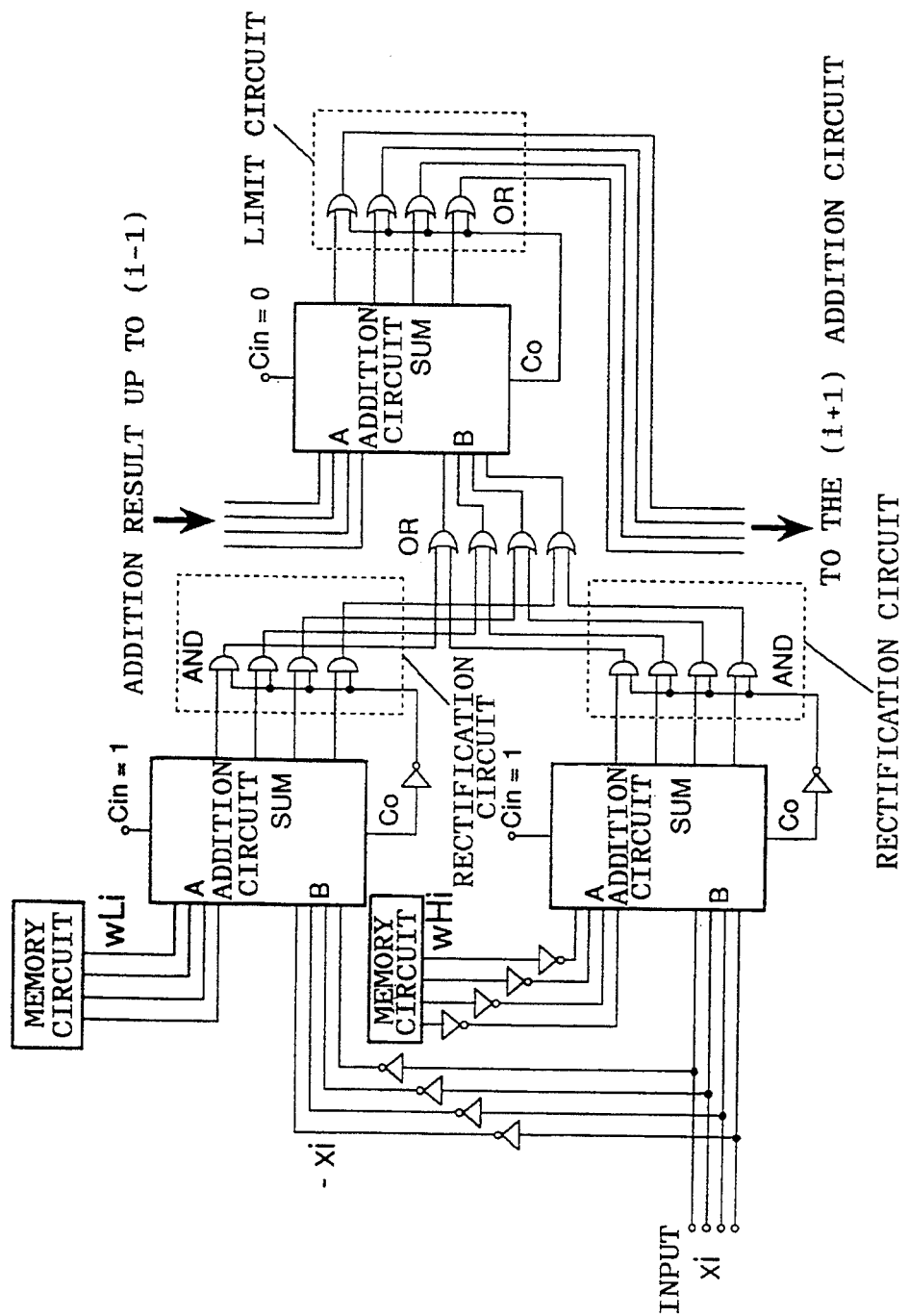
FIG. 12 hows a structural example of a calculation circuit of a prolate multisurface body identification type neuron circuit in accordance with the third preferred embodiment of the present

An example of the structure of the neuron circuit for realizing of the third neural network circuit in accordance with the present invention by means of digital circuits is shown in FIG. 12. In FIG. 12, only the calculation circuit corresponding to a number i input and weight coefficient, which represent the input part of the neuron circuit, and a number i addition circuit, which conducts the accumulation of the calculation results from 1 to n, are shown. When the carry output (Co) of the addition circuit which executes the subtraction of the input signal and the weight coefficient is "1", the result of the calculation is a negative number, and the rectification circuit does not transmit negative numbers by using an AND gate. Furthermore, among the calculation results of the wH and wL coefficients, at least one is a 0 output, so that the addition of both results can be simply executed by an OR gate. Hence, the number of addition circuits which conduct accumulation is not greater than that in the case of FIG. 1. Accordingly, one neuron circuit in accordance with the third embodiment of the present invention has a circuit scale in which the number of addition circuits used for the calculation of the weight coefficients only increases to 2, from I in the case of FIG. 1.

In the second preferred embodiment, it was stated that two squaring circuits were necessary for each input. However if a structure such as that in FIG. 12 is adopted, in which a first addition is conducted by OR circuits and after this squaring circuits are disposed, the same calculations can be conducted, so that one squaring circuit can be provided for each input as in the conventional circuit. When the scale of the circuitry of the addition circuit and the squaring circuit are compared, the squaring circuit is overwhelmingly larger, so that the proportionate increase in the scale of the circuitry of the one neuron circuit of the present invention is small.

The extent of the reduction of the necessary number of neurons varies depending on the application. However, the amount of reduction is very large when compared with a large scale neural network circuit, on the order of 1/100th–1/10,000th or less, so that the reduction in the scale of the circuitry of the neural network circuit in accordance with the present invention is extremely large.

Neuron Circuit 3

Figure 13:
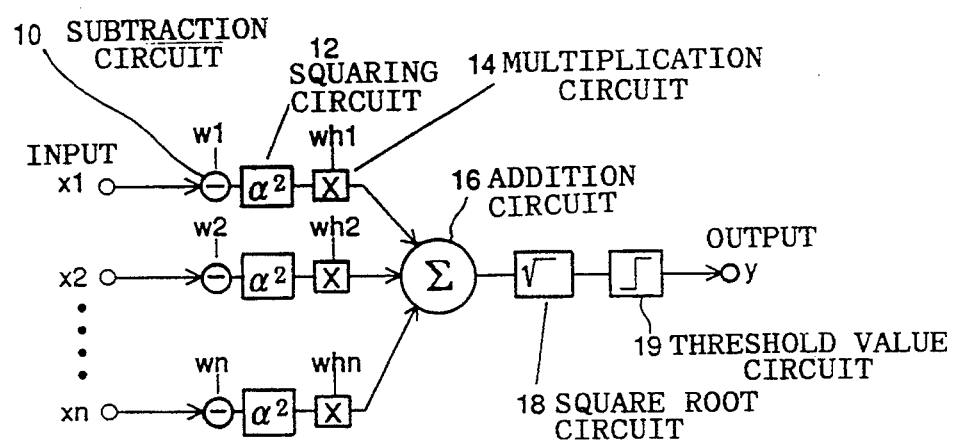
FIG. 13 is a block diagram of a fourth preferred embodiment of the neuron circuit of the present invention.

The structure of a fourth preferred embodiment of a neuron circuit in accordance with the present invention is shown in FIG. 13. The present preferred embodiment converts the subtraction result of the input signal and the weight coefficient obtained by the subtraction circuit using squaring circuits. It is provided with n input terminals (n is an integer>1), and 2n weight coefficients, each two of which corresponds to the various input terminals. The subtraction circuits determine the differences between the input signals and one group of weight coefficient w of the two-coefficients groups, these subtraction results are converted to positive values by the squaring circuits, and are multiplied in the multiplication circuits by the remaining weight coefficient wh. The calculation results of the inputs and weight coefficients are all accumulated in the adding circuit, and the output value is determined from these results.

Figure 14:
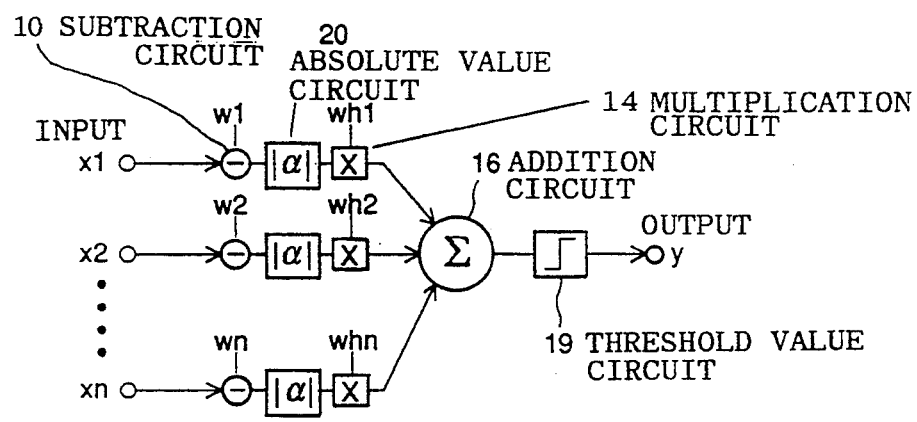
FIG. 14 is a block diagram of a fifth preferred eodiment of the neuron circuit of the present invention.

The structure of a fifth preferred embodiment of the neuron circuit of the present invention is shown in FIG. 14. The present preferred embodiment converts the subtraction result of the input signal and the weight coefficients obtained by the subtraction circuits using absolute value circuits. It has n input terminals (n is an integer>1), and 2n weight coefficients, each two of which corresponds to various input terminals. The subtraction circuits determine the differences between the input signals and one group of the weight coefficients w of the coefficient groups. The subtraction results are converted to positive values in the absolute value circuits, and are multiplied by the remaining weight coefficients wh in the multiplication circuits. The calculation results of the inputs and the weight coefficients are all accumulated by the addition circuit and the output value is determined based on these results.

Figure 15:
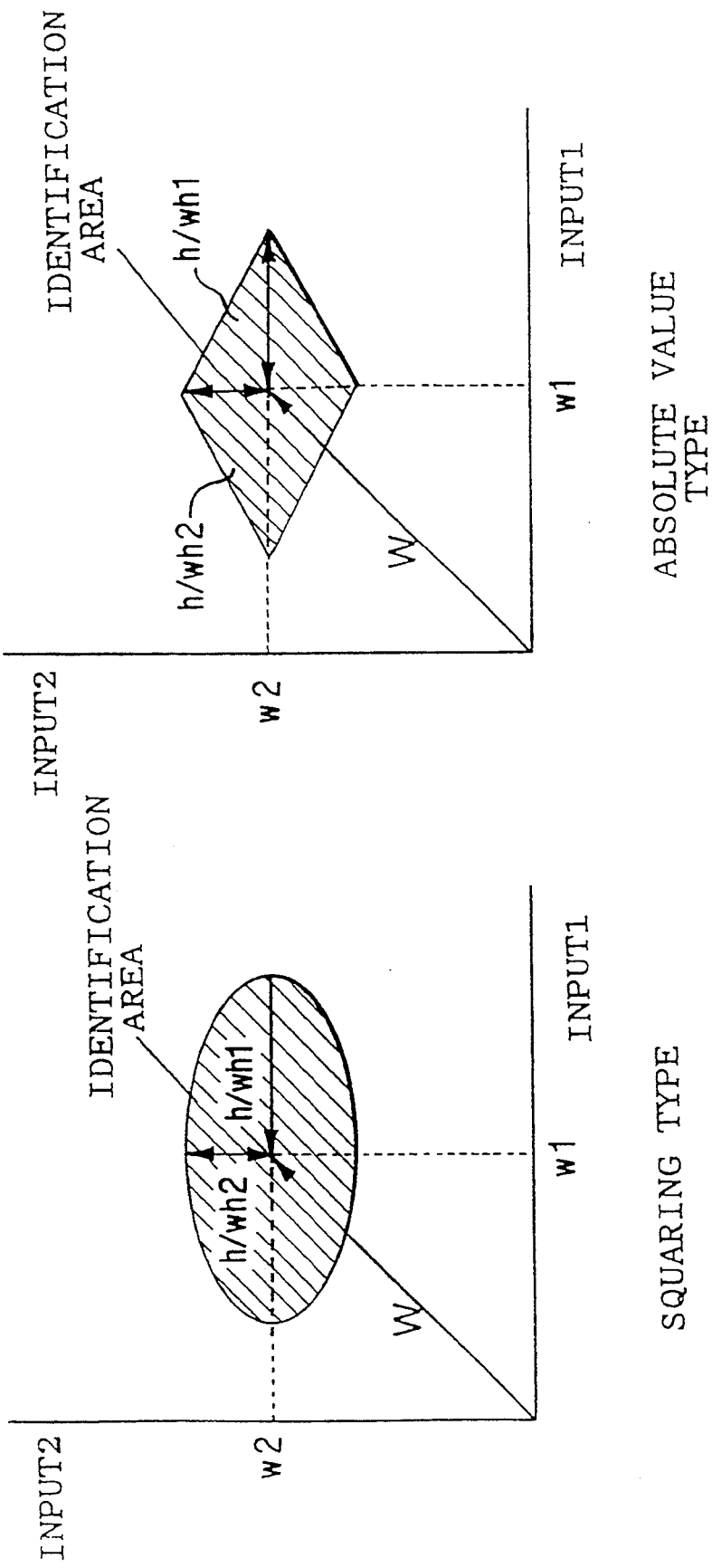
FIG. 15 shows the identification areas of the neuron circuits of fourth and fifth preferred embodiments of the present invention (in the case of two inputs)

FIG. 15 shows identification area shapes of the neuron circuits in accordance with the fourth and fifth embodiment of the present invention. In the case in which the number of inputs is 2, the shape of the area formed by one neuron circuit as shown in FIG. 13 is that of an ellipse, as shown in FIG. 15(A). Furthermore, in the case of a neuron circuit as shown in FIG. 14, the shape of the area formed by one neuron circuit is that of a diamond, as shown in FIG. 15(B).

For example, in the preferred embodiment of FIG. 13, the boundary point with respect to input 1 is (input 1−w1) wh1=h, so that the radius in the direction of input 1 becomes h/wh1. In the same way, the radius in the direction of input 2 becomes h/wh2. That is, the diameter can be freely controlled by weight coefficient wh. Furthermore, in the preferred embodiment of FIG. 14, as well, the diagonal direction of the quadrangle can be freely controlled. In this manner, the degree of freedom of the shape of the identification area of the neuron circuit in accordance with the present invention becomes high. Hence, the same effect can be obtained as in the second and third preferred embodiments of the present invention depicted in FIGS. 2 and 3.

Concrete Circuitry

When the above-described neural network circuit is realized, an extremely large amount of calculation circuits are required in order to execute the coefficient calculations and accumulation calculations. Also, there is a problem in that these circuits consume a great deal of power. In order to reduce this power consumption and to shorten the processing time, it is efficient to construct the above neural network circuit utilizing the accumulation addition circuit described hereinafter.

The accumulation addition circuit of the present invention makes use of the final threshold value processing characteristics. All input signals of the accumulation addition circuits have a single polarity, and the intermediate result of the accumulation addition increases in a monotone fashion. Hence, in comparison with the saturation point value in the threshold value processing, in the case in which the accumulation result exceeds the saturation point, the threshold value circuit outputs a predetermined value. Thus, unnecessary calculations having no effect on the output results are truncated, and it is possible to shorten processing time and reduce the power consumption.

Concrete Circuitry Example 1

Figure 16:
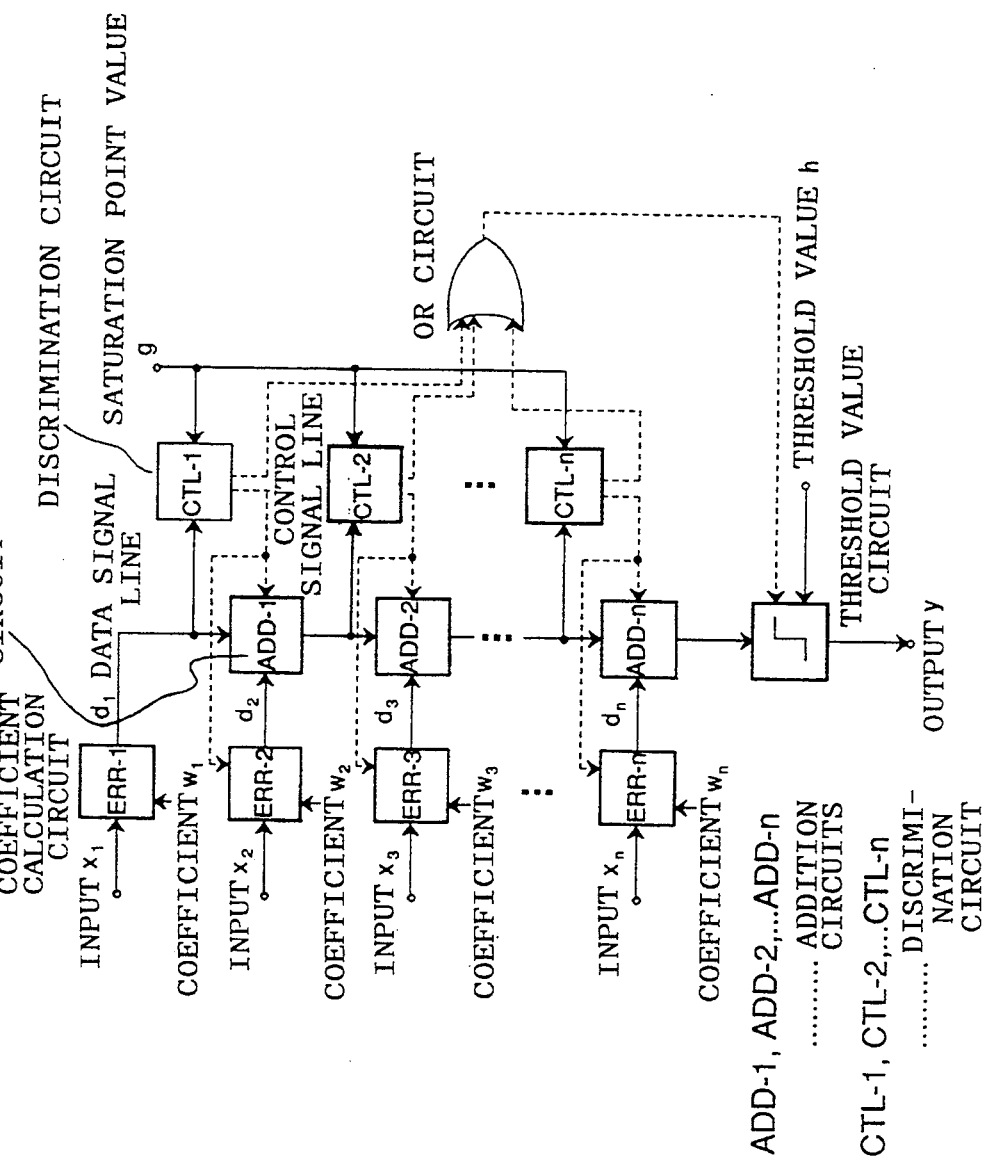
FIG. 16 is a block diagram of a first preferred embodiment of the accumulation calculation circuit of the neuron circuit of the present invention, FIG. 17 a block diagram of a second preferred embodiment of the accumulation calculation circuit of the neuron circuit of the present invention.

The preferred embodiment of FIG. 16 includes n addition circuits having two input terminals ADD-1, ADD-2, . . . ADD-n, as an addition mechanism, one threshold value circuit as a threshold value processing mechanism, and n discrimination circuits CTL-1, CTL-2, . . ., CTL-n, and an OR circuit for the judgment results of each discrimination circuit CTL-1, . . . as a control mechanism. First two input signals d 1 and d 2 having identical polarity are inputted into the first addition circuit ADD-1, the addition result of ADD-1 and input signal d 3 having identical polarity are inputted into the second addition circuit, and thereinafter, in the same way, the addition result which is accumulated from an addition circuit having a number n−1 (omitted in the diagram) and an input signal dn having identical polarity are inputted into an addition circuit ADD-n having a number n. The accumulated addition result is inputted into the threshold value circuit. As shown in FIG. 31, the threshold value circuit has transmission characteristics according to the output level that is saturated at a value of g. Next, the input signal d 1 and the saturation point value g of the threshold value circuit 1 are inputted into the first discrimination circuit CTL-1, the addition result of the first addition circuit ADD-1 and the saturation point value g are inputted into the second discrimination circuit CTL-2 as the threshold value of the threshold value circuit 1, and hereinafter in the same way, the accumulation addition result of an addition circuit having a number n−1 (omitted in the diagram) and the saturation point value g are inputted into a discrimination circuit CTL-n having a number n. Each discrimination circuit determines the size relationship of the addition result of the addition circuit and the saturation point value g. If the addition result is larger than g, in order to truncate the calculations, in the discrimination circuit, a control signal is sent to the addition circuit by means of the discrimination result, and this directs the truncation of the calculations after this addition circuit. In addition, the discrimination results of each discrimination circuit CTL-1, CTL-2, . . . CTL--n are inputted into an OR circuit, the OR output is inputted into the threshold value circuit, and in the case in which the calculations have been truncated, an output having an output value Hi corresponding to the saturation point g is directed. In this way, in the case of a value in which the intermediate results of the accumulation addition have no effect on the output result of the threshold value processing, it is possible to output a correct output value without conducting all additions.

In a case in which there is a coefficient calculation circuit for the purpose of determining di before each input signal di, it is possible to omit such calculations in the seine way.

Figure 17:
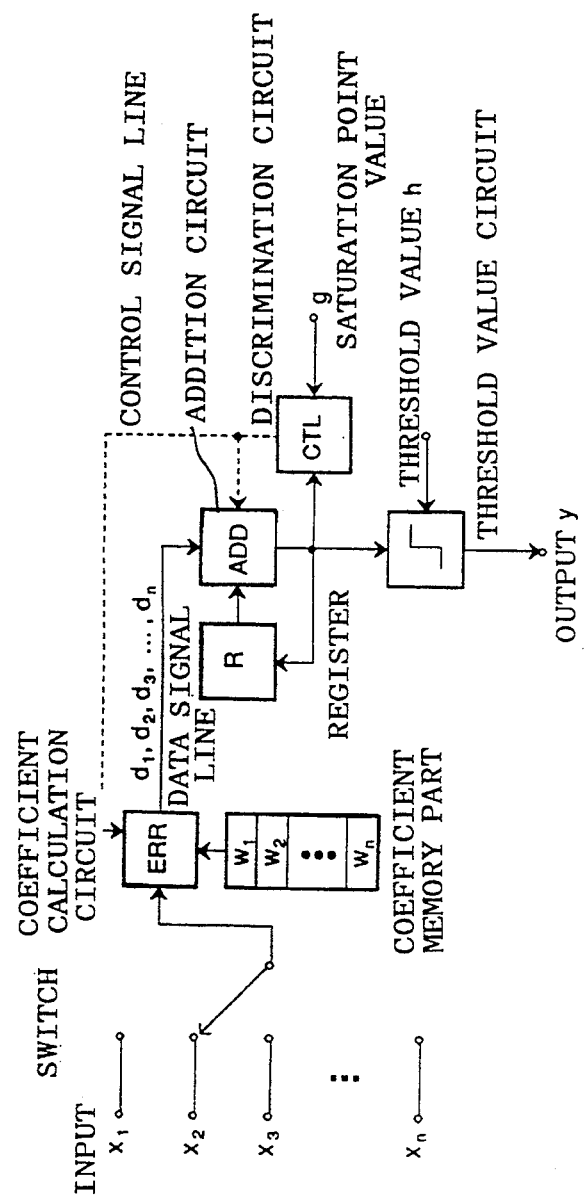

The preferred embodiment of FIG. 17 is a preferred embodiment in a case in which the addition circuits and discrimination circuits are multiplexed with respect to the above circuitry. This embodiment is provided with an n number of input terminals and one output terminal, and includes one addition circuit (ADD), one register (R), and a switch for switching n input signal d1, d2, . . . . dn having identical polarity. The input signals are inputted into n input terminals, in order, and successively inputted into the addition circuit, as an addition mechanism. The embodiment includes threshold value circuit, into which the addition result accumulated in the addition circuit and the register is inputted, and which carries out threshold value processing and converts the output value into an output signal y of the output terminal, as a threshold value processing mechanism. The embodiment also includes a discrimination circuit (CTL), as a control mechanism, and the like. Each time the calculated addition result accumulated by the addition circuit is inputted into the discrimination circuit, the saturation point value g which represents the threshold value of the threshold value circuit is inputted as well. The discrimination circuit compares the sizes of the addition result which is accumulated by the addition circuit and the saturation point value g. From this comparison result, cases in which the addition result has not affected the output value of the threshold value circuit are discriminated, and a control signal which truncates calculation at that point is transmitted to the addition circuit. The control signal which establishes the output value Hi of the saturation point as the output signal is transmitted to the threshold value circuit, and operation proceeds in the same manner as in the case of the preferred embodiment of FIG. 16.

Concrete Circuitry Example 2

Figure 18:
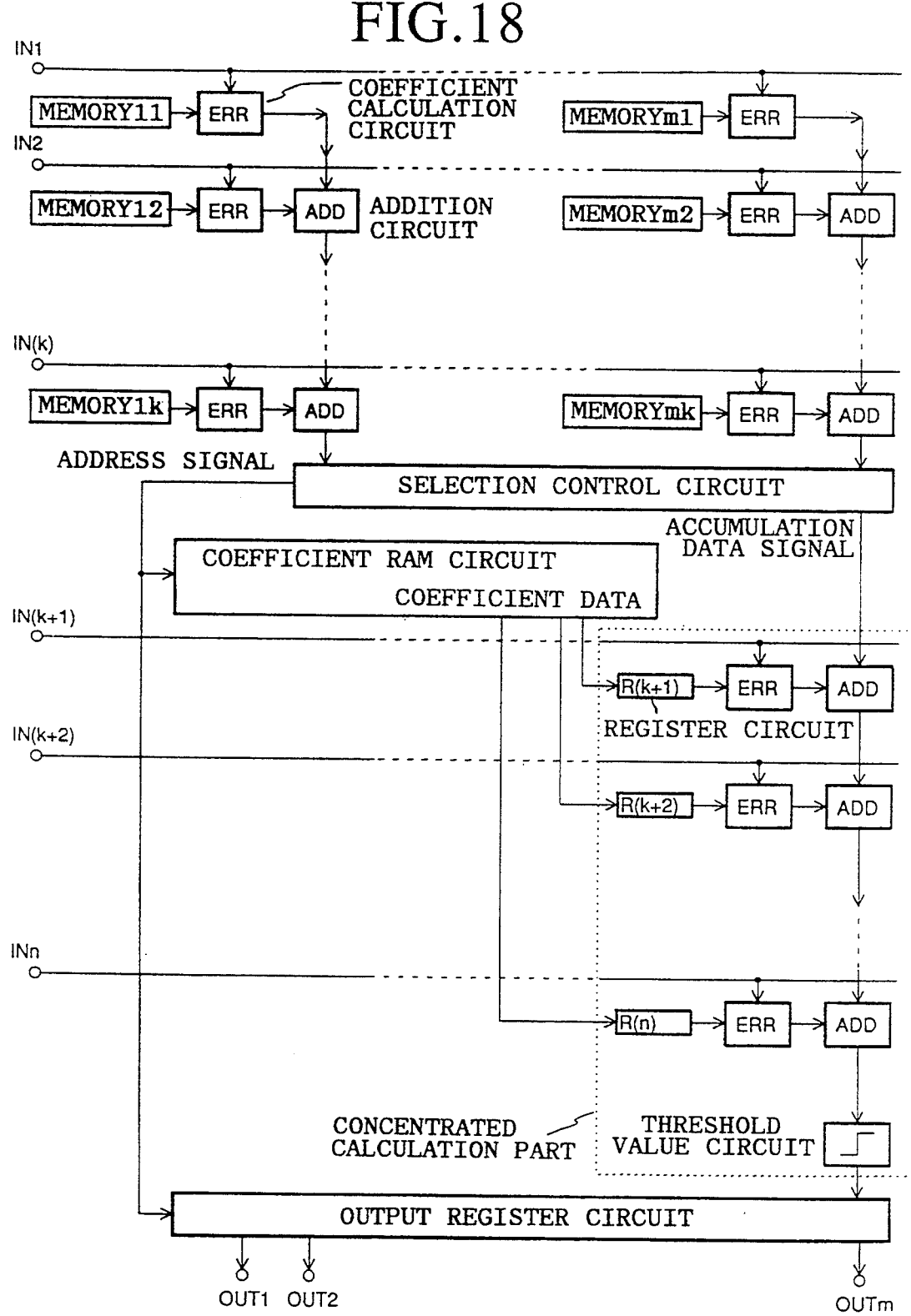
FIG. 18 is a block diagram of a third preferred embodiment of the accumulation calculation circuit of the neuron circuit of the present invention.

Another preferred embodiment of an accumulation addition circuit in accordance with the present invention is shown in FIG. 18. This preferred embodiment has a structure in which the number of input terminals is n and the number of output terminals is m. A coefficient calculation circuit and an addition circuit are provided in parallel with respect to the first through the kth signals of the input terminals and corresponding to all calculations. However, with respect to the inputs of the (k+1)th input terminal to the nth input terminal, only the concentrated calculation part shown in the diagram executes the calculation. A number m of intermediate results of the calculation corresponding to the input terminal number 1 to k exist and correspond to m output terminals, and these intermediate results are all inputted into a selection control circuit. The selection control circuits select one of 1 to m intermediate results of the calculation and inputs this into the concentrated calculation circuit part. At this time, the selection control circuit simultaneously outputs, as an address signal, information indicating which of the output terminals from the first output terminal to mth output terminal the selected signal corresponds to. The address signal is inputted into the coefficient RAM circuit and the output register circuit. The coefficient R4 circuit reads out the necessary coefficient data by means of the address signal and transmits this to the (k+1)th to nth register circuits of the concentrated calculation part. Also, in the concentrated calculation part, the calculations of the input signals and coefficients of the (k+1) to n are executed and the intermediate results of the calculations corresponding to 1 to k are accumulated. The accumulation results of the calculations corresponding to all inputs are inputted into the threshold value circuit. The output signal of the threshold value circuit is outputted by the output register circuit to the output terminal which is selected by means of the address signal, and the output register circuit holds the output signal. In this manner, calculation circuits corresponding to the inputs numbered (k+1) to n are almost completely omitted.

Figure 19:
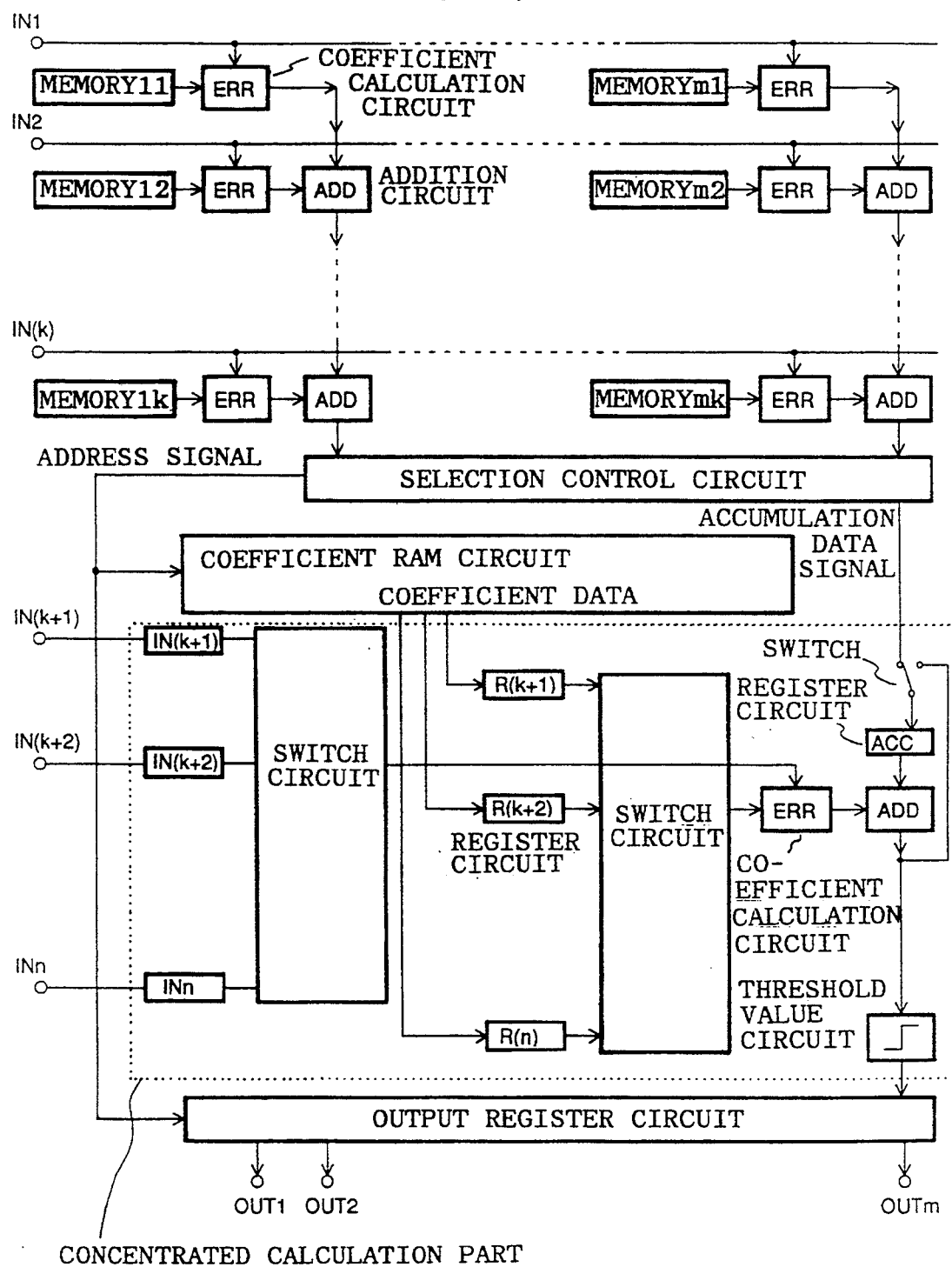
FIG. 19 is a block diagram of a fourth preferred embodiment of the accumulation calculation circuit of the neuron circuit of the present invention.

In addition, in the preferred embodiment shown in FIG. 19, the structure of the concentrated calculation part differs from that in the above-mentioned preferred embodiments. In order to further reduce the scale of the circuitry of the coefficient calculation circuit and the addition circuit, the preferred embodiment is so structured as to enable the execution of the calculations corresponding to the numbers (k+1) to n in a coefficient calculation circuit and an addition circuit made into a group by means of a register circuit ACC, which is used for accumulation, and switch circuits. In other words, switch circuits are provided at the two inputs of the coefficient calculation circuit, and the input terminals and coefficients are thus switched. From this, the scale of the calculation circuitry corresponding to the inputs numbered (k+1) to n can be reduced in comparison with the above-mentioned preferred embodiment.

Figure 20:
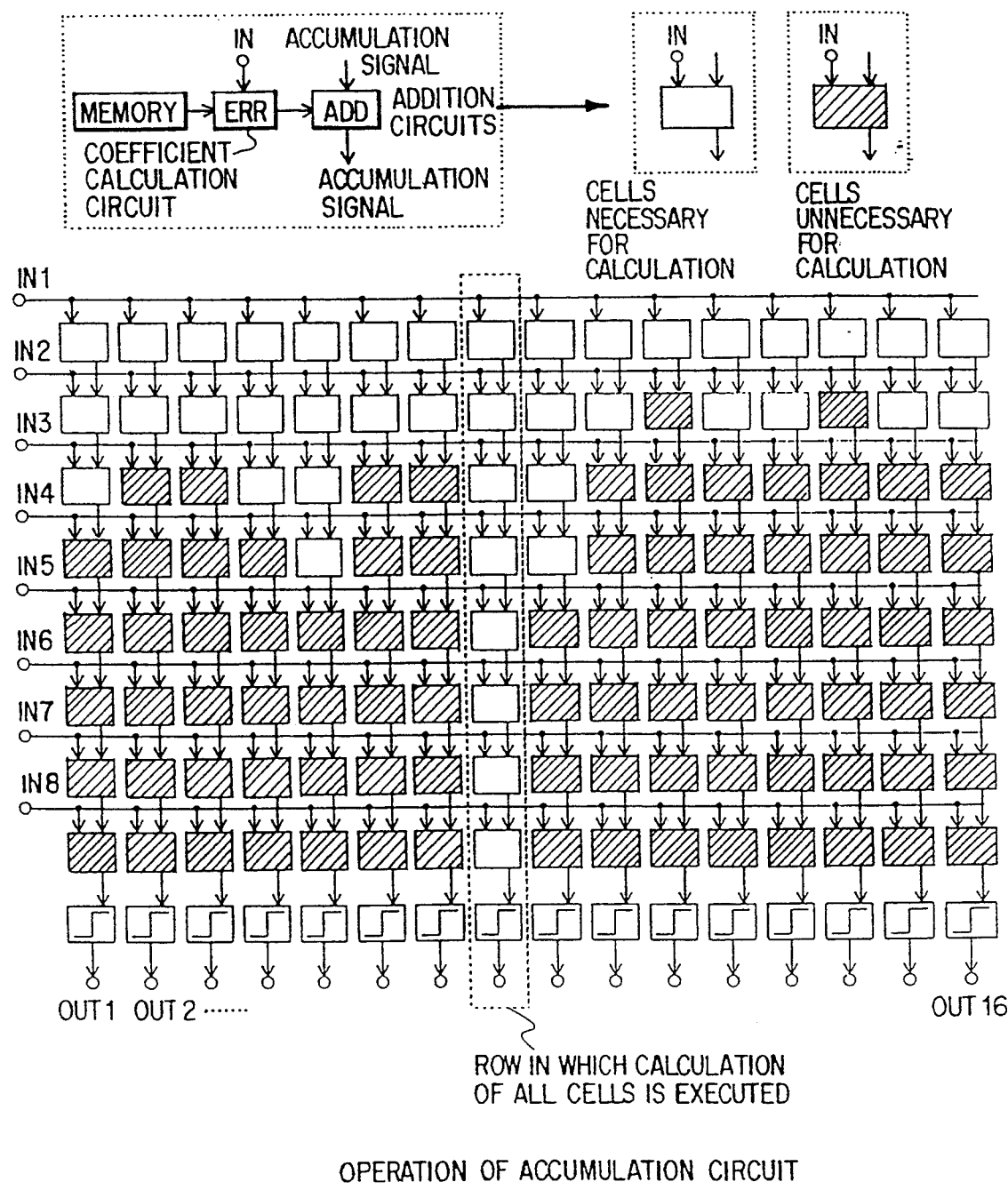
FIG. 20 is an explanatory diagram of the operation of the accumulation calculation circuit of the neuron circuit of the present invention.

The operation of the accumulation circuit is shown in FIG. 20. A coefficient calculation circuit, an addition circuit, and a coefficient memory circuit can be thought of as one cell. FIG. 20 shows the calculation operation of each cell with respect to a case in which the number of output terminals m is 16 and the number of input terminals n is 8. The coefficient calculation circuit normally calculates the difference and distance between input signals and coefficients in pattern recognition and the like. In this case, the output of the coefficient calculation circuit is an integer. On the other hand, the threshold value circuit has saturation characteristics, as shown in FIG. 31, the saturation characteristics, when the input level exceeds a predetermined value, the output level does not change. In other words, when the output level reaches the saturation level, no matter how large the input level grows above this, the output level does not change. Accordingly, in the combination of the accumulation calculations and the threshold value circuit, the accumulation result only increases in a monotone fashion, so that if the output level reaches the saturation level during accumulation, the calculations after this point can be omitted. FIG. 20 shows the cells which are necessary for calculations, and cells which are unnecessary for calculations. In this example, the only row in which all cells must execute calculations is the first row. In general, in pattern recognition and the like, the design is such that one of the outputs reacts with respect to an input and the input patterns can be divided according to category.

In other applications, as well, because only a small number of neuron circuits react, most do not react. Accordingly, the operation shown in FIG. 20 has characteristics which can be seen in many applications. In the example of FIG. 20, after the fourth row of input terminals, only the calculations of the eighth calculation circuit are necessary, and it is therefore clear that the great majority of the calculation circuits can be omitted. The disposition of the cells which are necessary for calculation and those which are not necessary changes based on the input signals. However, as the distribution of cells which are not necessary for calculations is close to the form shown in FIG. 20, irrespective of the type of input signals, even if the calculation circuits are omitted in the same manner as the accumulation circuits of the present invention, calculations which are identical to those of the conventional circuit can be executed. As stated above, in accordance with the present invention, it is possible to greatly reduce the scale of the circuitry with almost no reduction in calculation speed. Furthermore, as a result of the omission of the calculation circuits, the power consumption is greatly reduced as well.

Concrete Circuitry Example 3

Figures 21A, 21B:
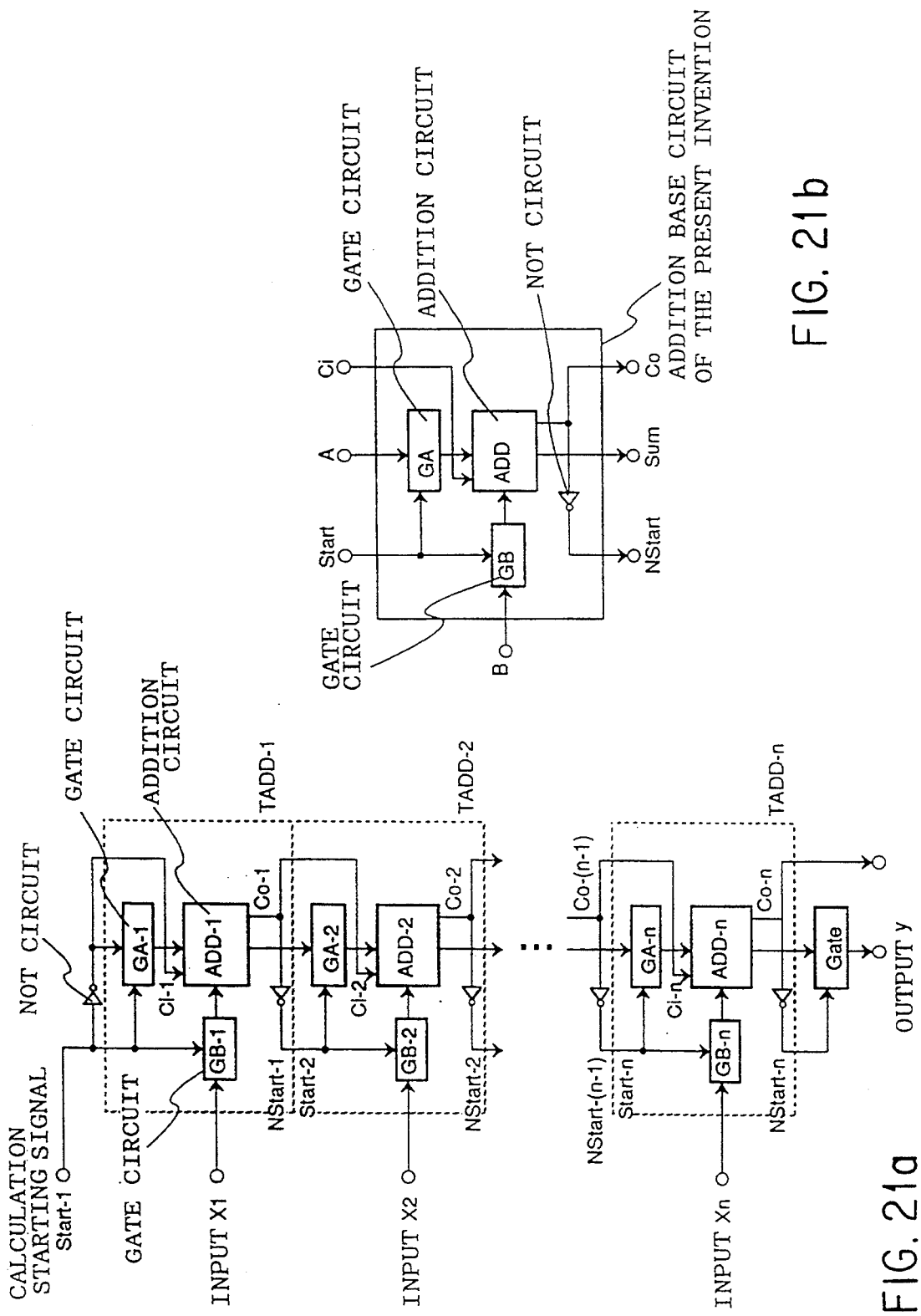
FIG. 21 is a block diagram of a fifth preferred embodiment of the accumulation calculation circuit of the neuron circuit of the present invention.

It is possible to control the truncation of the accumulation addition calculations by means of a carry output signal which indicates the carrying over of addition circuits. The structure of an accumulation addition circuit which is controlled by means of a carry output signal is shown in FIG. 21. The addition based circuit of FIG. 21 (b) has signals A and B to be added, carry input Ci, and an input terminal for a calculation starting signal Start, and has output terminals for addition output signal Sum, carry output Co, and calculation ending signal, NStart. The signals A and B to be added are inputted into addition circuit ADD through the medium of gate circuits GA and GB as values to be added. The carry input Ci is inputted into addition circuit ADD as a carry input. The calculation starting signal Start is used as the control signal of gate circuits GA and GB. The addition result of addition circuit ADD is outputted to addition output signal Sum, the carry output signal of addition circuit ADD is outputted to carry output Co, and furthermore, the inversion of the carry output signal of addition signal circuit ADD is outputted to calculation ending signal NStart. Gate circuits GA and GB are each provided with one input terminal, output terminal and control signal terminal, and when the control signal has a value of 0, the greatest obtainable value is outputted from the output terminal. When the control signal has a value of 1, the value which is inputted from the input terminal is outputted in an unchanged manner to the output terminal of the gate circuits.

In the initial period state, the value of calculation starting signal Start is set to 0, and the carry input Ci is set to 1. At this time, irrespective of the values of the signals A and B to be added, the outputs of gate circuits GA and GB have the highest obtainable values, and since the carry input Ci has a value of 1, the highest obtainable value is outputted to addition output signal Sum, a value of 1 is outputted to the carry output Co, and a value of 0 is outputted to calculation ending signal NStart. By setting the value of calculation starting signal Start to 1 and setting the value of carry input Ci to 0, the incorporation and calculation of signals A and B to be added in addition circuit ADD begins. In a case in which the addition result A+B is smaller than the highest obtainable value, the addition result A+B is outputted to addition output signal Sum, a value of 0 is outputted to carry output Co, and accordingly, a value of 1 is outputted to calculation ending signal NStart. In a case in which the addition result A+B is greater than the highest obtainable value, the values of the carry output Co and calculation ending signal NStart do not change from those of the initial.

Positive value input signals X1, X2, X3 ..., Xn are inputted from a plurality of input terminals (n in number). The calculation starting signal Start-1 is inputted as the input signal. When a value of 1 is inputted as the calculation starting signal Start, calculation begins. When the number i input signal Xi is inputted into the addition base circuit, and a value of 1 is inputted into the calculation starting signal Start, this is added to the accumulation result of the inputs up to the number (i−1) input. In the case in which the addition result is smaller than the largest obtainable value of the addition base circuit, the addition result is outputted to the addition output signal Sum-i, a value of 0 is outputted to the carry output Co, and a value of 1 is outputted to the calculation ending signal NStart-i, and the calculation of the next addition base circuit is begun. In the case in which this addition result is greater than the largest obtainable value, the value of the carry output Co-i is 1, and the value of the calculation ending signal NStart-i remains as 0, so that the accumulation calculation ends at this step, and the largest value is outputted as the final output y (the output of addition circuit ADD-n). The output of the number n addition circuit ADD-n is outputted as output y by means of a gate Gate having the same functions as those of GA and GB. This gate Gate is controlled by NStart-n and in the addition of addition circuit ADD-n, in the case in which the accumulation value becomes greater than the greatest obtainable value for the first time, this gate prevents the outputting of a value other than the greatest value as output y.

By means of this structure, in the case in which the final accumulation result is less than the largest obtainable value, the final accumulation result is outputted as output y. In the case in which the final accumulation result is larger than the largest obtainable value, the largest obtainable value is outputted as output y.

Figure 22:
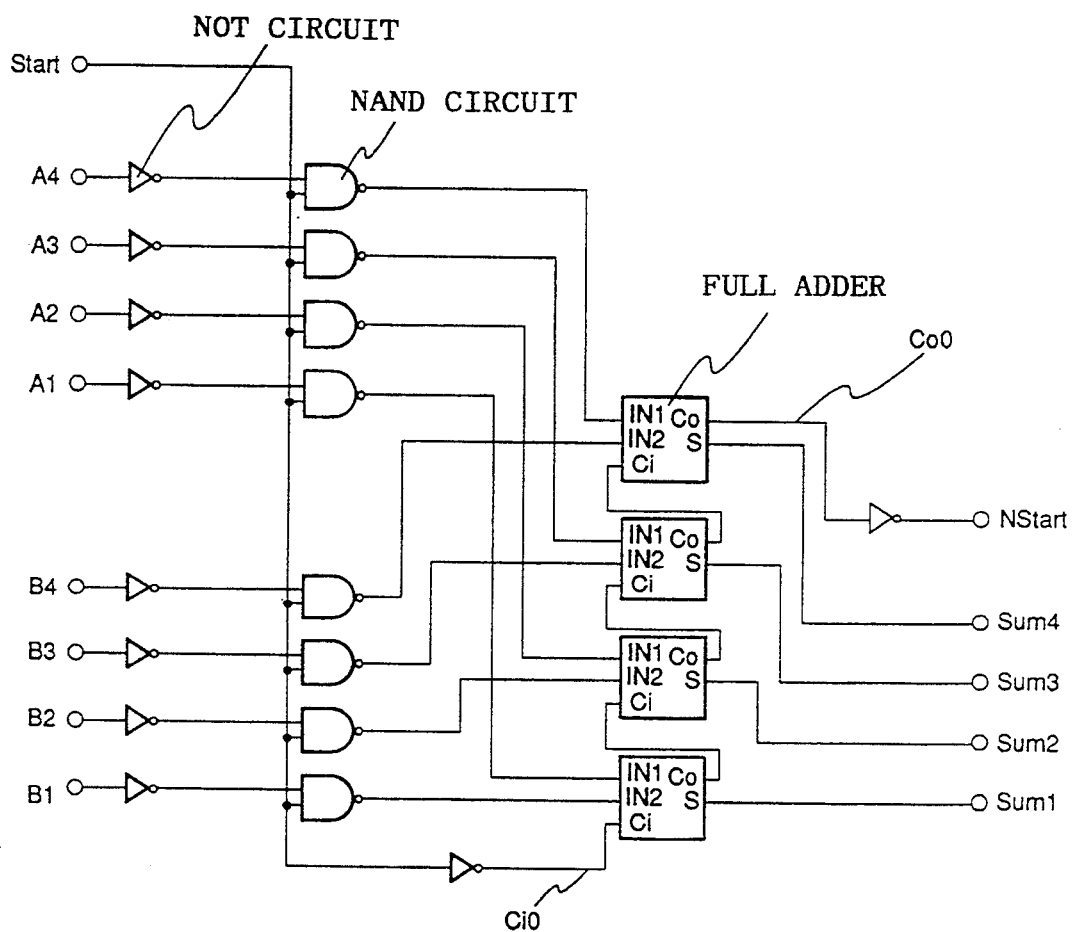
FIG. 22 is a block diagram of the addition base circuit of the accumulation calculation circuit of the neuron circuit of the present invention.

An addition base circuit structure in the case in which each number value signal is expressed in terms of a four-bit binary code is shown in Fig. 22. The input signals A1, A2, A3, A4, B1, B2, B3 and B4 represent the first, second, third and fourth bits of the signals A and B which are to be added. Furthermore, the output signals Sum1, Sum2, Sum3 and Sum4 represent the first, second, third and fourth bits of the addition result signal Sum. The input signal Ci0 represents the carry input signal, the output signal Co0 represents the carry output signal, the input signal Start represents the calculation starting signal, and NStart represents the calculation ending signal. The input and output terminals IN1 and IN2 of the full adder represent the input signals to be added, Ci represents the carry input signal, S represents the addition output signal, and Co represents the carry output signal. The carry output signal Ci0 generally has the inverted value of the calculation starting signal Start. In the initial state, the value of the calculation starting signal Start is set to 0, and the value of carry input Ci0 is set to 1. As one of the inputs of all of the NAND circuits is Start at this time, the output of the NAND circuits, that is, the input signals IN1 and IN2 to be added all have values of 1. Furthermore, as the value of carry input Ci0 is also 1, the addition output signals Sumi (i represents integers from 1 to 4) of the full adder, and the carry output signal Co0 all have values of 1, and the largest obtainable value is outputted as addition output signal Sum, and a value of 1 is outputted as carry output Co0. By setting the value of calculation starting signal Start to 1 and setting carry input Ci to 0, the NAND circuits operate as NOT circuits, so that Ai and Bi are inputted into the outputs of the HAND circuits, that is, into the input signals IN1 and IN2 to be added in the full adder. At this time, the carry input Ci0 has a value of 0. In the case in which the addition result A+B is less than the largest obtainable value, the addition result A+B is outputted to the addition output signal Sum, a value of 0 is outputted to the carry output Co0, and accordingly, a value of 1 is outputted to calculation ending signal NStart. In the case in which the addition result A+B is greater than the largest obtainable value, the value of carry output Co and the value of calculation ending signal NStart do not change from the initial state.

If the calculation ending signal NStart is taken from a carry output signal of an addition circuit having a number of bits i, then when the addition result becomes 2i+1, if the number of bits is set, NStart will become 0, and calculations will stop. So that calculations will stop when the level becomes higher than the saturation level of the threshold value circuit, the truncation of calculation without affecting the output of the threshold value circuit, is possible.

Concrete Circuitry Example 4

In the above-mentioned concrete circuitry example 3, after the addition output signals of each bit of the full adder which comprises the number i addition circuit are ascertained, in order that the calculation starting signal START (i+1) of the number (i+1) calculation be outputted, it is necessary to insert a delaying circuit along the START signal line. As a result, it is not possible to greatly shorten the processing time.

Here, by providing control gate circuits which are controlled by means of the carry output signals from the addition circuits previous to the (i−1)th input for one of the value input signals to be added of each one-bit full adder forming a number i (or ith) addition circuit ADD(i) and for the carry input signal, and by conducting pipeline-type processing for each bit, it is possible to realize the same functions without providing a delay circuit in the signal line of STUART (i).

Figure 23:
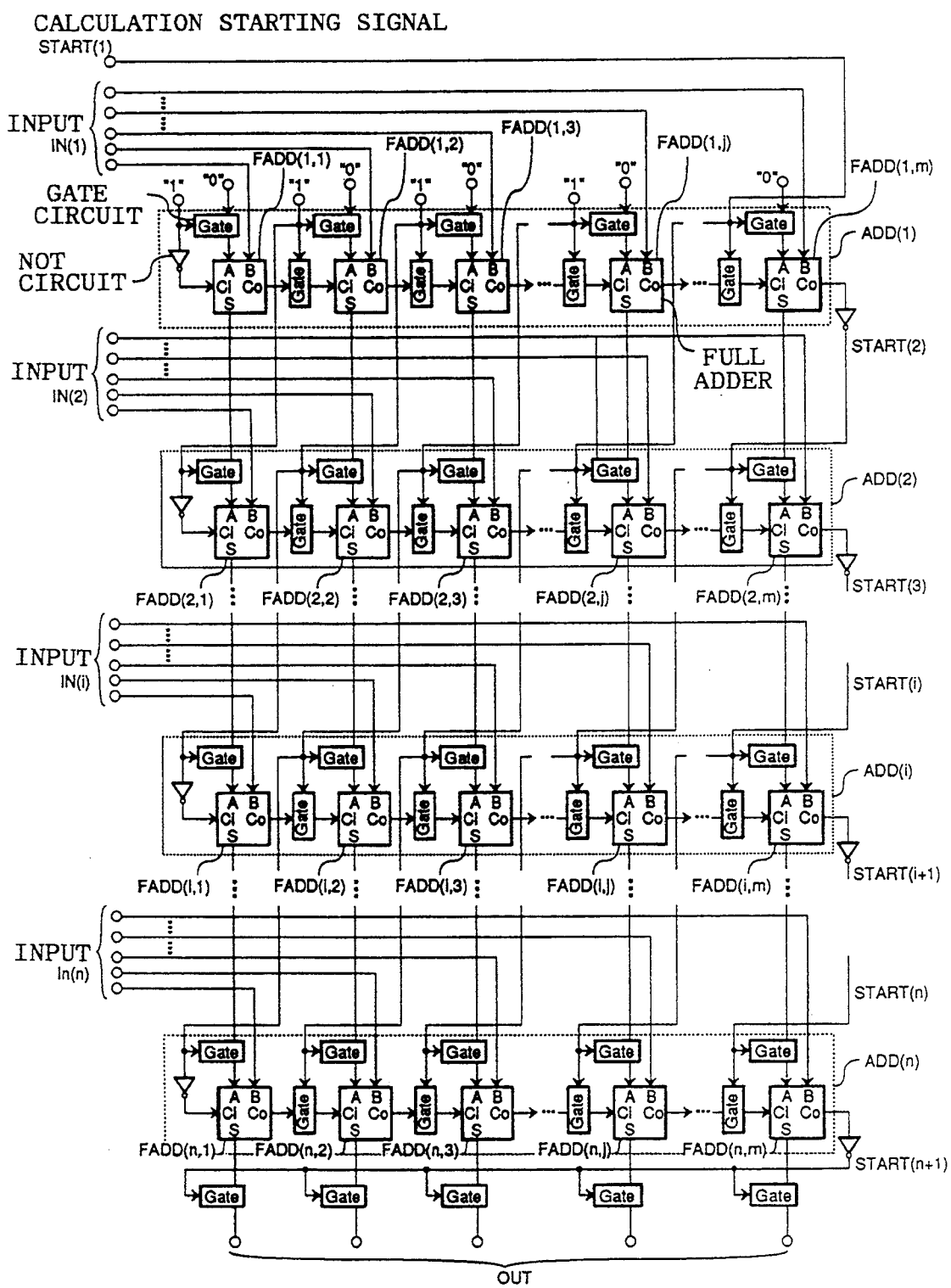
FIG. 23 is a block diagram of a sixth preferred embodiment of the accumulation calculation circuit of the neuron circuit of the present invention.

The circuit structure of the present preferred embodiment is shown in FIG. 23. Positive-value digital input signals IN(1), IN(2), IN(3), . . . , IN(n) which are expressed in four-bit natural binary code, are inputted from a plurality (n) of input terminals, and in addition, calculation starting signal START(1) is inputted. The number i is an integer between 1 and n and each input IN(i) has a corresponding m-bit addition circuit ADD(i). The number i addition circuit ADD(i) has an input signal IN(i) which is, one of the input values that is to be added thereof, and has as the other value to be added thereof, the addition output of the number (i−1) addition circuit ADD(i−1). Accumulation addition is conducted on all inputs.

The m-bit addition circuit ADD(i) has a first bit as a lowest position bit thereof, and a number m bit as the highest position bit thereof, so that if j is an integer between 1 and m, the circuit includes a number m of one-bit full adders FADD(i,1), FADD(i,2), FADD(i,3), . . . , FADD(i,j), . . . , FADD(i,m). Among the one-bit full adders which form the addition circuit ADD(i), the number j-bit full adder is FADD(i,j), the input signals to be added of FADD(i,j) are A and B, and the addition output is S. Between the input signals A and B, the accumulation intermediate result up to the number (i−1) input, that is, the addition output of FADD-(i−1,j) is A, while a signal from the number i. The carry output signal Co of FADD(i,J) is inputted into the carry input signal Ci of FADD(i,j+1).

For the 1 bit full adders FADD(i,j) which form the ith addition circuit ADD(i), into the A side of which the output of the number (i−1, j) addition circuit is inputted, and for the carry input signal Ci, control gate circuit is disposed which controls the input of the value to be added and the carry signal. When i=1, and jm, in other words, in the case of the full adder FADD(1,m) of the highest position bit of an addition circuit ADD(1) corresponding to the first input, the control input signal START (1) is inputted into the control gate circuit as a control signal. When i=1, and j=/m (=/means not equal to), in other words, in the case of a full adder FADD(1,j) (j=/m) of a bit other than the highest position bit of the addition circuit ADD(1) corresponding to the first input, a value of 1 is inputted into the control gate circuit as the control signal.

Furthermore, when i=/1 and j=m, in other words, in the case of a full adder FADD(i,m) of the highest position bit of an addition circuit ADD(i), (i=/1) corresponding to an input other than the first, START(i) is inputted. When i=/1 and j=/m, in other words, in a case of a full adder FADD(i,j), (j=/m) of a bit other than the highest position bit of an addition circuit ADD(i) (i=/1) corresponding to an input other than the first, a control signal is inputted. The control signal is identical to a control signal corresponding to the full adder of a one-bit higher position comprising an addition circuit corresponding to an input which is one before the full adder in question. This means that in the case in which i−(w−j) is less than or equal to 0, a value of 1 is inputted as the control signal corresponding to full adder FADD(i,j). In the case in which i=1 and j=m, the control input signal START(i) is inputted externally as this control signal, and in cases other than these, the control signal START(i−(m−j)) is inputted. The control signal START(i) is the inverse of the carry output signal Co of full adder FADD(i−1, m) of the highest position bit of the (i−1) number addition circuit. When the control signal of these control gate circuits have a value of 0, they generally output a value of 1, and when the control signal has a value of 1, they generally output the value of the input signal which is inputted into the control gate circuit. Furthermore, a control gate circuit can not be placed for the control input signal Ci of the full adder FADD(i,1) of the lowest position bit of the number i addition circuit. The inverse of the control signal corresponding to whole full adder FADD(i,1) is inputted.

The addition output signals S of the one-bit full adders forming the number m addition circuits are inputted into the control gate circuits which have START(n+1) as the control signal thereof. The outputs of these control gate circuits are outputted as the output OUT of the accumulation addition circuit.

In the initial state, the value of the calculation starting signal START(1) is set to a value of 0. As described above, in the case in which i=1, that is, in an addition circuit ADD(1) corresponding to the first input, j not equalling m, that is, a full adder FD(1,j) (j=/m) of a bit other than the highest position bit, a value of 1 is inputted as the control signal of the gate. For this reason, in the case of a full adder FADD(i,j) in which i−(m−j) is less than or equal to 0, the control gate becomes open (the state in which the output and input are equal). In the case of a full adder within this range, the value which is to be used in addition to the input which is to be added and the carry input is indicated, and addition is actually executed. This means that in the case of the ith input, the calculations of the full adder from the first bit to the number m−1 bit have already been conducted in this state. Because the value of START(1) is set to 0, in the case of other full adders, in other words, full adders such as full adder FADD(i,j) in which i−(m−j)

is greater than 0, the output of each control gate circuit which is provided becomes 1, and the carry output signal Co of full adder FADD(i,m) of the highest bit position becomes 1, so that the signal START(i) has a value of 0 in the case of all values of i. Because the value of START(n+i) is 0, all bits of the output OUT of the accumulation addition circuit have a value of 1, so that the highest value which can be expressed in a positive value m-bit natural binary code is outputted.

When a value of 1 is inputted into calculation starting signal START(1), the calculations begin. When the value of START(1) becomes 1, the control gate circuit of the full adder FADD(1,m) of the highest position bit of addition circuit ADD(1) corresponding to the first input opens, and the calculations of the full adders begin. In addition, in circuit ADD(1), as explained above, at the stage in which the value of START(1) is 0, the calculations of the full adders up to the number (m−1) bit have been conducted, so that when the value of START(1) becomes 1, a positive value is immediately outputted to the output following the signal delay time of full adder FADD(1,m). In the case in which the addition result of this addition circuit ADD(1) is smaller than the greatest value expressible in m-bit natural binary code, the addition result is outputted as the output of the addition circuit, a value of 0 is outputted as the carry signal of the full adder FADD(1,m) of the highest position bit, the control signal START(2) acquires a value of 1, and the accumulation calculation of the following input signal IN(2) begins. In the case in which this addition result is greater than the greatest value expressible in m-bit natural binary code, the carry signal of the full adder FADD(1,m) of the highest position bit remains at 1, and the signal START(2) remains at a value of 0 and thus does not change, so that the accumulation calculation ends at this step. The output OUT of the accumulation addition signal remains at the greatest value expressible in positive value m-bit natural binary code. Furthermore, at the stage at which this START(1) acquires a value of 1, the control gate circuits of full adders FADD(2,m−1), FADD(3,m−2), . . . , FADD(m,1) open, and the calculations of these full adders begin. (In the case in which i=1, one of the addends is 0, so that this addition circuit can be omitted.)

In the full adders forming the addition circuit ADD(i), the control gate circuit of the number j full adder FADD(i,j) opens when the value of START(i+j−m) changes from 0 to 1, and the calculation of this full adder thus begins. The carry input signal of the full adder, which is necessary for conducting this calculation, is the carry output signal of full adder FADD(i,j−1). However, the calculation of full adder FADD(i,j−1) begins by means of the immediately previous control signal START(i+j−m−1), and the time gap between START(i+j−m) and START(i+j−m−1) is almost equivalent to the signal delay period of a one-bit full adder. Hence, when the value of START(i+j−m) changes from 0 to 1, the correct value which is to be used for the calculation is inputted into FADD(i,j), and after the signal delay period of the one-bit full adder FADD(1,m), a correct value is outputted, Thereafter, calculations continue in an identical manner, and when the calculation starting signal START(i) changes from 0 to 1, the control gate circuit of the full adder FADD(i,m) of the highest position bit of addition circuit ADD(i) corresponding to the number i input opens, and the calculation of this full adder begins. The calculations of the number (m−1) bit full adder will begin at the stage at which the value of START(i−1) becomes 1. Hence, when the value of START(i) becomes 1, a correct value is immediately inputted as the carry input signal of full adder FADD(i,m), and after the signal delay period of the one-bit full adder FADD(i,m), a correct value is outputted. In the case in which the accumulation addition result up to the ith input is smaller than the largest value expressible in m-bit natural binary code, this addition result is outputted as the output of the addition circuit corresponding thereto, a value of 0 is outputted as the carry signal of the full adder of the highest position bit, and the value of signal START(i+i) becomes 1. In the case in which the accumulation addition result up to the number i input is larger than the largest value expressible in m-bit natural binary code, the carry signal of the full adder of the highest position bit remains unchanged with a value of 1, and the value of signal START(i+1) remains unchanged at 0. Hence, the accumulation calculations stop at this stage, and the output OUT of the accumulation addition circuit remains at the largest value expressible in positive value m-bit natural binary code.

The accumulation calculations proceed to the number n addition circuit, and in a case in which the value of START(n+i) becomes 1, n positive value m-bit digital input signals IN(1), IN(2), IN(3), . . . , IN(n) representing accumulation addition results are outputted as output OUT of the accumulation addition circuit.

In the case in which the signal line of START is provided with a delay circuit, if the delay time of a one-bit full adder is taken to be tADD, then it is necessary that the delay time tDELAY of the delay circuit be on a level of roughly $2 \times n \times tADD$, so that the time necessary to conduct the accumulation addition of a number n of input signals is $m \times tDELAY = 2 \times n \times m \times tADD$.

In contrast, in the circuit of the present invention, pipeline-type processing is conducted for each bit, so that the calculation time necessary for the addition corresponding to each input is roughly equivalent to the signal delay time tADD of a one-bit full adder. As a result, the time necessary to conduct the accumulation addition of a number n of input signals is roughly $n \times tADD$. Accordingly, it is possible to execute this in a processing time of $1/(2 \times m)$. This means that in the case of eight-bit input signals, it is possible to increase the speed by roughly sixteen times.

Concrete Circuitry Example 5

In concrete circuitry examples 3 and 4, when the intermediate result of the accumulation in an addition circuit exceeded $Sb = (2^i)$, the input of the values to be added into the addition circuit is controlled using the carry signal of the addition circuit, and by means of stopping the accumulation calculation from the following addition circuit onward, the accumulation calculations are stopped when the intermediate result of the accumulation exceeds Sb.

In contrast, when the largest value expressible with the bit length of the addition circuit is taken to be Sb, and g represents a freely selected positive value (g is less than Sa), Sa−g is initially inputted into the accumulation circuit, an addition circuit is provided on the output side of the number n addition circuit, the addition result of the number n addition circuit is inputted as one of the inputted values to be added in the addition circuit, and −(Sa−g) is inputted as the other inputted value to be added. Hence, the initial value is subtracted, and it thus becomes possible to stop the accumulation calculation at the stage at which the intermediate results of the accumulation exceed the freely selected positive value g.

Figure 24A:
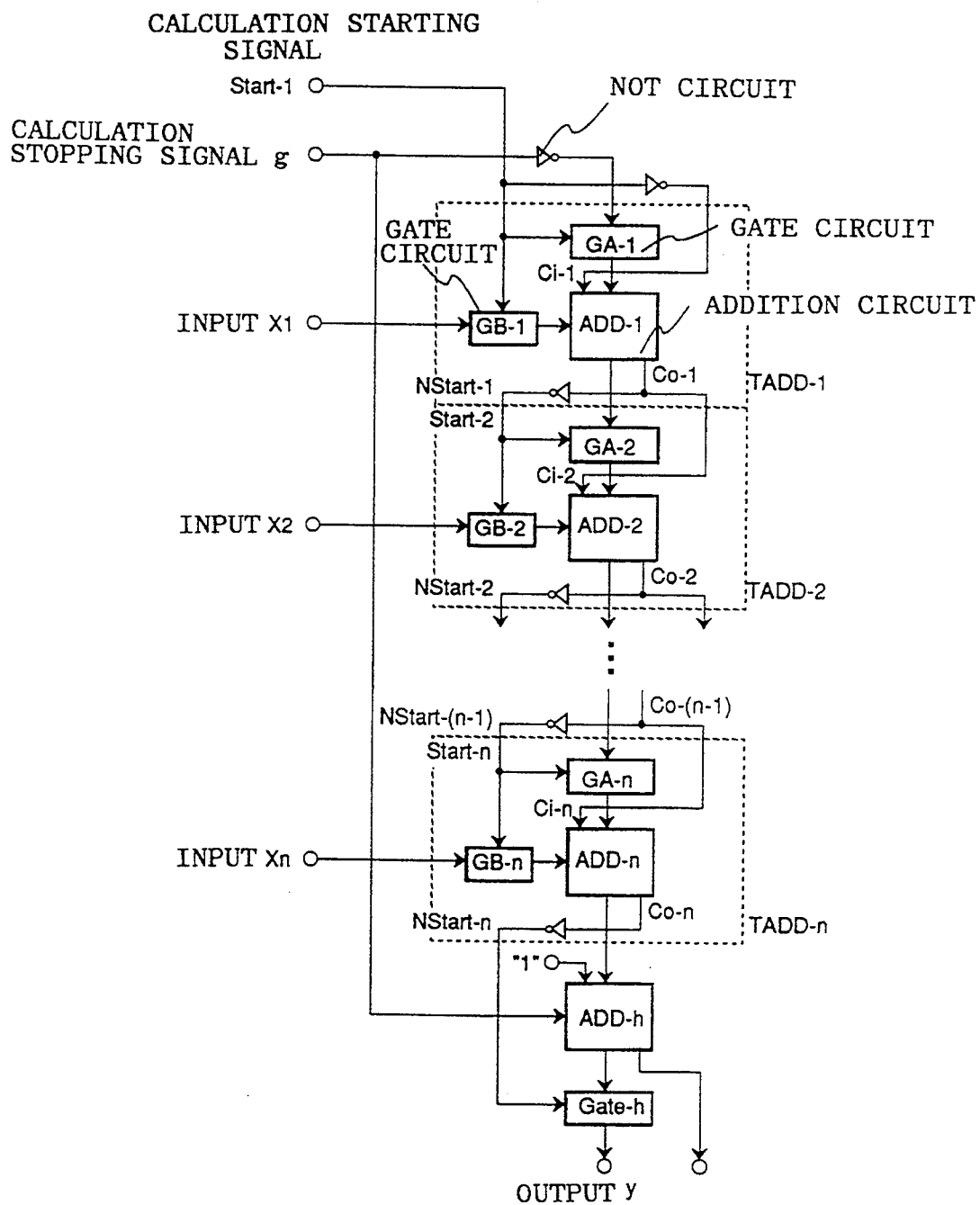
FIG. 24 is a block diagram of a seventh preferred embodiment of the accumulation calculation circuit of the neuron circuit of the present invention.
Figure 24B:
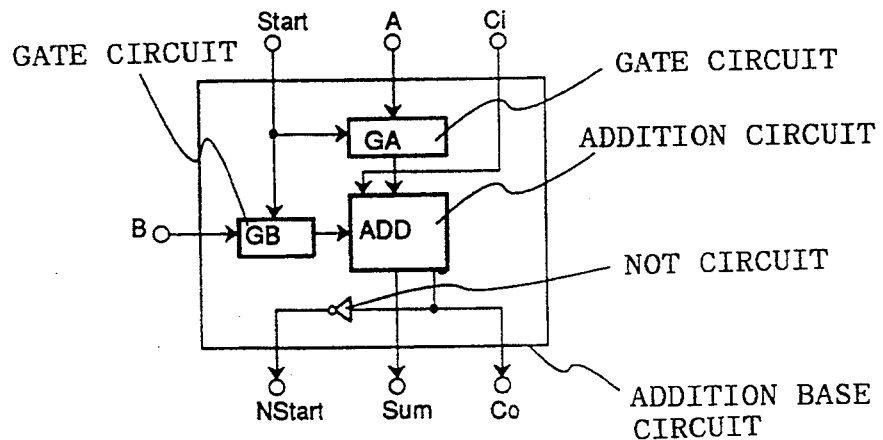

A preferred embodiment of the present invention is shown in FIG. 24. In comparison to the preferred embodiment of FIG. 21, modifications have been made which permit the setting of the initial value of the accumulation and the final subtraction of the initial value. The same modifications are possible with respect to the preferred embodiment of FIG. 23.

In accordance with this structure, in the case in which the final accumulation result is outputted as output y, and in the case in which the final accumulation result is larger than calculation stopping value g, the accumulation calculation is truncated.

If the value of g is set to the saturation level of the threshold value circuit, unnecessary calculations are eliminated to a greater extent than in the case of the accumulation calculation stopping control by means of $Sb=(2^j)$, so that the effects of the shortening of the calculation time and the reduction of the power consumption are large.

Simplified Circuitry Example

In the above-mentioned concrete circuit examples, accuracy of calculation did not worsen as a result of the elimination of calculations. Accordingly, the invention possesses a high degree of flexibility and can be applied in many fields. However, if a certain amount of decrease in the accuracy of calculations is permissible, the circuitry can be simplified as shown below.

Figure 25:
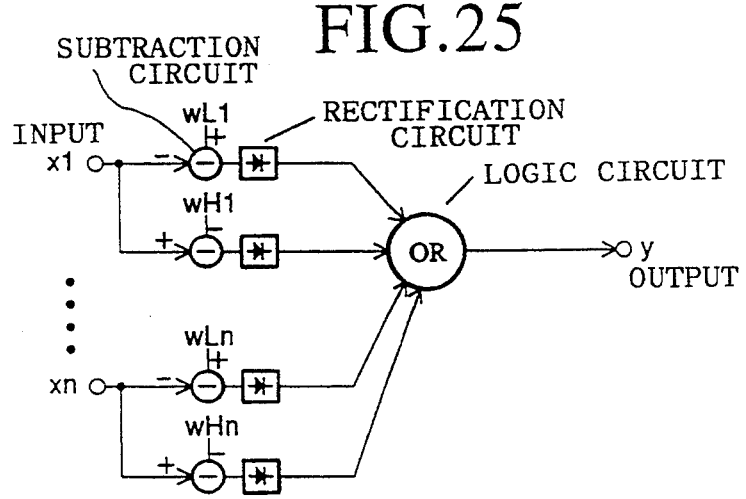
FIG. 25 is a block diagram of a first simplified preferred embodiment of the neuron circuit of the present invention.

First, in the preferred embodiment of FIGS. 2 and 3, the output signal of the rectification circuit which rectifies the subtraction result of the input signals and the weight coefficients, which is generally expressed at the level of eight bits, is expressed in terms of one bit. That is, if the rectification circuit output is 0, this bit has value of "0", and if the output is larger than 0, the bit has a value of "1". As a result of this, the squaring circuits of FIG. 2 become unnecessary. Furthermore, if the characteristics of the threshold value circuit are taken to be those of the step function shown in FIG. 31(a), output y can be expressed in terms of one bit, so that the same functions will be realized if the accumulation addition circuit and threshold value circuit are replaced by OR logic circuits. As a result of the above circuit modifications, the circuits of FIGS. 2 and 3 have a structure such as that shown in FIG. 25. In FIG. 25, the accumulation addition circuit, which necessitated large scale circuitry, is replaced by a single logic circuit, and a large reduction in the scale of the circuitry results.

Figure 26:
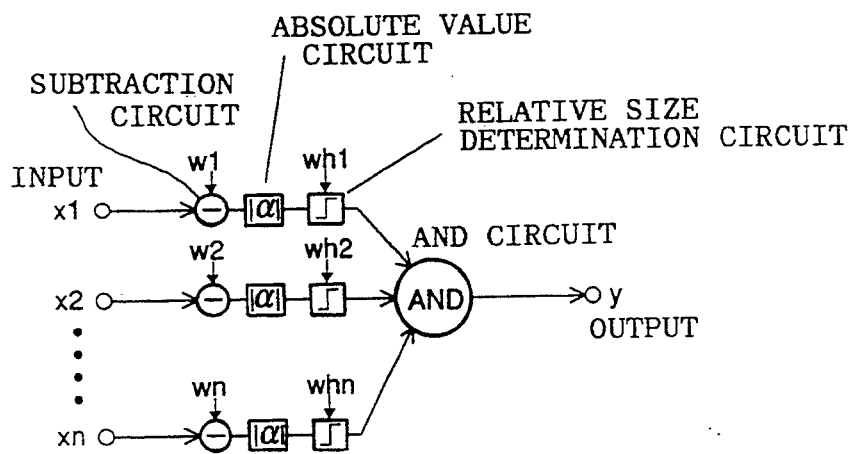
FIG. 26 is a block diagram of a second simplified preferred embodiment of the neuron circuit of the present invention.
Figure 27:
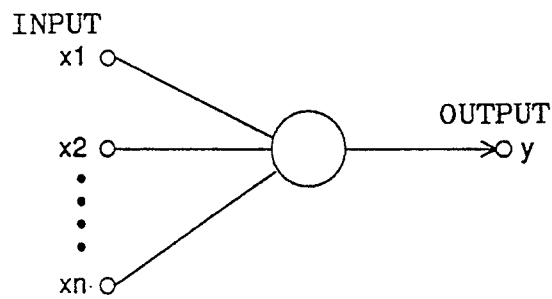
FIG. 27 shows the symbol of a neuron circuit.
Figure 28:
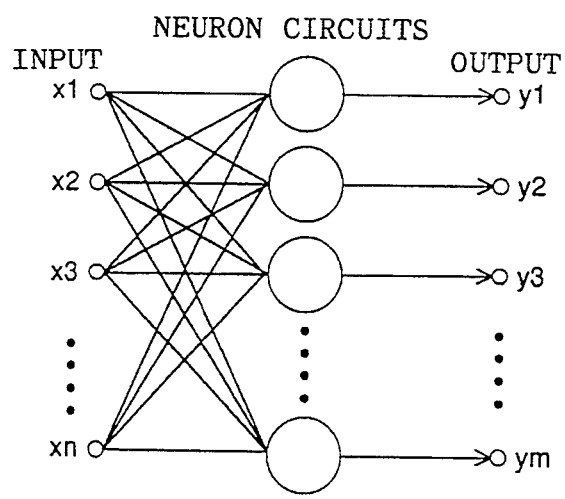
FIG. 28 shows the structure of a two-layer, structure-type neural network circuit.

Second, the same type of circuit simplification is possible with respect to the preferred embodiments of FIGS. 13 and 14 as well. In this case, the multiplication circuits are replaced by size determination circuits, and when the output level of the squaring circuits or the absolute value circuits is compared with the size of the weight coefficient wh, this result is expressed in terms of a one-bit signal. As a result, it is possible to replace the accumulation addition circuit and the threshold value circuit with logic circuits as explained above, and the simplified structure of FIG. 26 is possible.

When a neural network circuit is translated into hardware, the necessary number of neuron circuits differs depending on the application. However, in general, the greater the number of neuron circuits, the greater the increase in processing ability. For this reason, the realization, by means of large-scale integrated circuits, of a neural network circuit on which a number of neuron circuits are placed has been expected. However, the scale of the circuitry which can be placed on one chip is limited as a result of the limitations in chip size, and the power which can be consumed by one chip is limited as a result of the problems of heat release and mounting. Accordingly, in order to provide a neural network circuit from a large scale integrated circuit with applicable characteristics, the reduction in the circuit scale and power consumption of the neuron circuit is the most important problem. As a result, by the use of the neuron circuit of the present invention, the characteristics of the neural network circuit can be increased to a level at which the application of the neural network circuit becomes possible.

The present invention has been concretely explained above based on the above-mentioned preferred embodiments. However, the present invention is in no way limited to the above-mentioned preferred embodiments. A variety of modifications are possible so long as the essentials of the invention are not omitted.

What is claimed is:

1. A neural network circuit including a plurality of neuron circuits, comprising:
    a plurality n of input terminals for receiving input signals, where n is an integer greater than 1;
    two weight coefficients corresponding to each of said input terminals;
    a first subtraction circuit for calculating a first difference between a larger one of said two weight coefficients and a corresponding input signal;
    a first rectification circuit for discriminating and passing only positive value results of said first subtraction circuit;
    a first non-linear circuit producing a non-linear output according to results from said first rectification circuit;
    a second subtraction circuit for calculating a second difference between a smaller one of said two weight coefficients and a corresponding input signal;
    a second rectification circuit for discriminating and passing only positive value results of said second subtraction circuit;
    a second non-linear circuit producing a non-linear output according to results from said second rectification circuit;
    an addition circuit for adding and accumulating outputs of said first and second non-linear circuits for each of said plurality n of input terminals;
    a threshold value circuit having a predetermined threshold value for determining a magnitude of a result of said accumulation in accordance with said predetermined threshold value, and outputting said accumulation result, wherein said neuron circuits use the output results of said threshold value circuit as output signals; and
    means of connecting input and output terminals of said neuron circuits, said neuron circuits having independent said weight coefficients with respect to a plurality of said input signals inputted into each of said network circuits for executing calculations, an output value of at least one of said neuron circuits being an output signal of said network circuit, and said two weight coefficients and a size of said threshold value of said threshold value circuit controlling said network circuit.

2. A neural network circuit according to claim 1, further comprising control means provided in said addition circuit for determining whether to truncate remaining addition calculations, said control means comparing a size relationship of an intermediate result of an accumulation addition corresponding to each input signal and said threshold value of said threshold value circuit, said threshold value circuit determining said output signal according to the comparison.

3. A neural network circuit in accordance with claim 1, wherein said addition circuit has m output terminals, where m is an integer larger than 1; and said addition circuits are disposed in parallel in groups of m with coefficient calculation circuits in order to determine a weight value as a single polarity coefficient calculation value according to one of the coefficients or according to a difference between an ith coefficient and an ith input signal with respect to said input signals from 1 to k, where i is an integer from 1 to k and k is an integer larger than 1 and smaller than n, said coefficient calculation circuits including a first coefficient calculation circuit provided in a dedicated fashion for one coefficient and a first addition circuit for conducting accumulation of first to kth outputs of said coefficient calculation circuits; and further comprising:

a selection control circuit for comparing an intermediate result of m accumulations and a saturation level of said threshold value circuit, determining whether to continue calculation with respect to the input signals of remaining input terminals, and outputting intermediate results of accumulation that are necessary for the continuation of calculation; and at least one second coefficient calculation circuit and one second addition circuit for use in common with respect to said input terminals for which continuation of calculation is necessary, said input signals and coefficient values are switched and accumulation calculation is continued, said accumulation results corresponding to first to nth input terminals are inputted into said threshold value circuit, and said threshold circuit outputting a processing result.

4. A neural network circuit in accordance with claim 1, wherein said addition circuit has a plurality n of said input terminals and an identical number of addition circuits;

each said input terminal has a positive value digital input signal as one value to be added in a corresponding addition circuit; and when i is an integer from 1 to n, an accumulation addition result from (i−1)th addition circuit is used as another value to be added of an ith addition circuit, said addition circuit being an accumulation addition circuit for conducting the accumulation addition of all input signals; and further comprising:

a gate circuit for controlling input values to be added into the corresponding addition circuits according to a carry signal from an immediately preceding addition circuit, said gate circuit having a value to be added at an input side of said addition circuit; and means for stopping the accumulation calculations of the ith addition circuit and onward when an accumulation addition result in the (i−1)th addition circuit exceeds a predetermined value.

5. A neural network circuit in accordance with claim 1, wherein said addition circuit has a plurality n of said input terminals and an identical number of addition circuits;

each said input terminal has a positive value digital input signal as one value to be added in a corresponding addition circuit; and when i is an integer from 1 to n, an accumulation addition result up to the (i−1)th addition circuit is used as another value to be added of an ith addition circuit, said addition circuit being an accumulation addition circuit for conducting the accumulation addition of all input signals; and further comprising:

a gate circuit controlled by a carry signal from a previous addition circuit and disposed between all values to be added, input terminals and carry input terminals of a plurality of one bit addition circuits comprising each addition circuit; and means for stopping the accumulation calculations of the ith addition circuit and onward when an accumulation addition result in the (i−1)th addition circuit exceeds a predetermined value.

* * * * *